United States Patent
Ikeda et al.

(10) Patent No.: US 10,600,202 B2
(45) Date of Patent: Mar. 24, 2020

(54) INFORMATION PROCESSING DEVICE AND METHOD, AND PROGRAM

(71) Applicant: Sony Corporation, Tokyo (JP)

(72) Inventors: Hiroshi Ikeda, Tokyo (JP); Seijiro Inaba, Kanagawa (JP)

(73) Assignee: Sony Corporation, Tokyo (JP)

(*) Notice: Subject to any disclaimer, the term of this patent is extended or adjusted under 35 U.S.C. 154(b) by 112 days.

(21) Appl. No.: 15/565,845

(22) PCT Filed: Jun. 9, 2016

(86) PCT No.: PCT/JP2016/067193
§ 371 (c)(1),
(2) Date: Oct. 11, 2017

(87) PCT Pub. No.: WO2016/208404
PCT Pub. Date: Dec. 29, 2016

(65) Prior Publication Data
US 2018/0114339 A1    Apr. 26, 2018

(30) Foreign Application Priority Data
Jun. 23, 2015 (JP) ................. 2015-125359

(51) Int. Cl.
*G06T 7/73* (2017.01)
*G01B 11/26* (2006.01)
(Continued)

(52) U.S. Cl.
CPC ............. *G06T 7/74* (2017.01); *G01B 11/002* (2013.01); *G01B 11/26* (2013.01); *G06T 7/60* (2013.01);
(Continued)

(58) Field of Classification Search
CPC .......... G06T 7/74; G06T 7/60; G01B 11/002; G01B 11/26; H04N 5/232; H04N 5/23229
See application file for complete search history.

(56) References Cited

U.S. PATENT DOCUMENTS 6,421,629 B1 * 7/2002 Ishiyama ............. G01B 11/255
702/159
2004/0222987 A1 * 11/2004 Chang ................. G01B 11/2509
345/419

(Continued)

FOREIGN PATENT DOCUMENTS

| JP | 2000-041173 A | 2/2000 |
|---|---|---|
| JP | 2013-141049 A | 7/2013 |
| WO | 2014/034035 A1 | 3/2014 |

OTHER PUBLICATIONS

Systems and Replication Review and Analysis of Solutions of the Three Point Perspective Pose Estimation Problem, International Journal of Computer Vision, 13, 3, 331-356 (1994), Haralick et al.*

(Continued)

*Primary Examiner* — Qun Shen
(74) *Attorney, Agent, or Firm* — Michael Best & Friedrich LLP

(57) ABSTRACT

The present technology relates to an information processing device and method, and a program which enable a photographing position and a photographing attitude to be inferred under a more lenient condition.
A position/attitude calculation unit calculates a photographing position and a photographing attitude of a captured image to be processed relative to a known photographing position and photographing attitude of one captured image in a reference space on the basis of two captured images having five or more feature points that correspond to each other. In addition, the position/attitude calculation unit calculates a photographing position and a photographing atti- (Continued)

tude of the captured image to be processed in the reference space on the basis of a position of a subject in the reference space corresponding to a common feature point in the two captured images and another captured image of which a photographing position and a photographing attitude are known and the photographing position and the photographing attitude of the captured image to be processed relative to the photographing position and the photographing attitude of the one captured image. The present technology can be applied to smartphones.

20 Claims, 14 Drawing Sheets

(51) Int. Cl.
  *G01B 11/00* (2006.01)
  *H04N 5/232* (2006.01)
  *G06T 7/60* (2017.01)
(52) U.S. Cl.
  CPC ............... *G06T 7/73* (2017.01); *H04N 5/232* (2013.01); *H04N 5/23229* (2013.01); *G06T 2207/30244* (2013.01)

(56) References Cited

U.S. PATENT DOCUMENTS

| | | | | |
|---|---|---|---|---|
| 2008/0285854 A1* | 11/2008 | Kotake | ...................... | G06T 7/73 382/190 |
| 2012/0050528 A1* | 3/2012 | Davies | ................... | G01C 11/02 348/136 |
| 2012/0148145 A1* | 6/2012 | Liu | ......................... | G06K 9/209 382/154 |
| 2014/0036046 A1* | 2/2014 | Hasegawa | ............ | H04N 13/128 348/54 |
| 2014/0285631 A1* | 9/2014 | Janky | ................... | G01C 21/206 348/47 |
| 2014/0375773 A1* | 12/2014 | He | ....................... | H04N 13/296 348/47 |
| 2015/0187091 A1* | 7/2015 | Hata | ...................... | G01B 11/02 382/101 |

OTHER PUBLICATIONS

Google Scholar Search Results.*
Xian-Shan Gao et al., "Complete Solution Classification for the Perspective-Three-Point Problem" posted on the Internet at http://www.mmrc.iss.ac.cn/~xgao/paper/ieee.pdf, Accessed on Apr. 8, 2015.

* cited by examiner

FIG. 7

| TECHNIQUE | NUMBER OF COMMON CORRESPONDING POINTS IN THREE CAPTURED IMAGES | NUMBER OF COMMON CORRESPONDING POINTS IN TWO CAPTURED IMAGES |
|---|---|---|
| FOUR-COMMON-POINT INFERENCE TECHNIQUE | FOUR | NONE |
| ONE-COMMON-POINT INFERENCE TECHNIQUE | ONE | FIVE (BETWEEN CAPTURED IMAGES CA31 OR CA32 AND CA33) |
| ZERO-COMMON-POINT INFERENCE TECHNIQUE | NONE | FIVE (CAPTURED IMAGES CA31 AND CA33) FIVE (CAPTURED IMAGES CA32 AND CA33) |

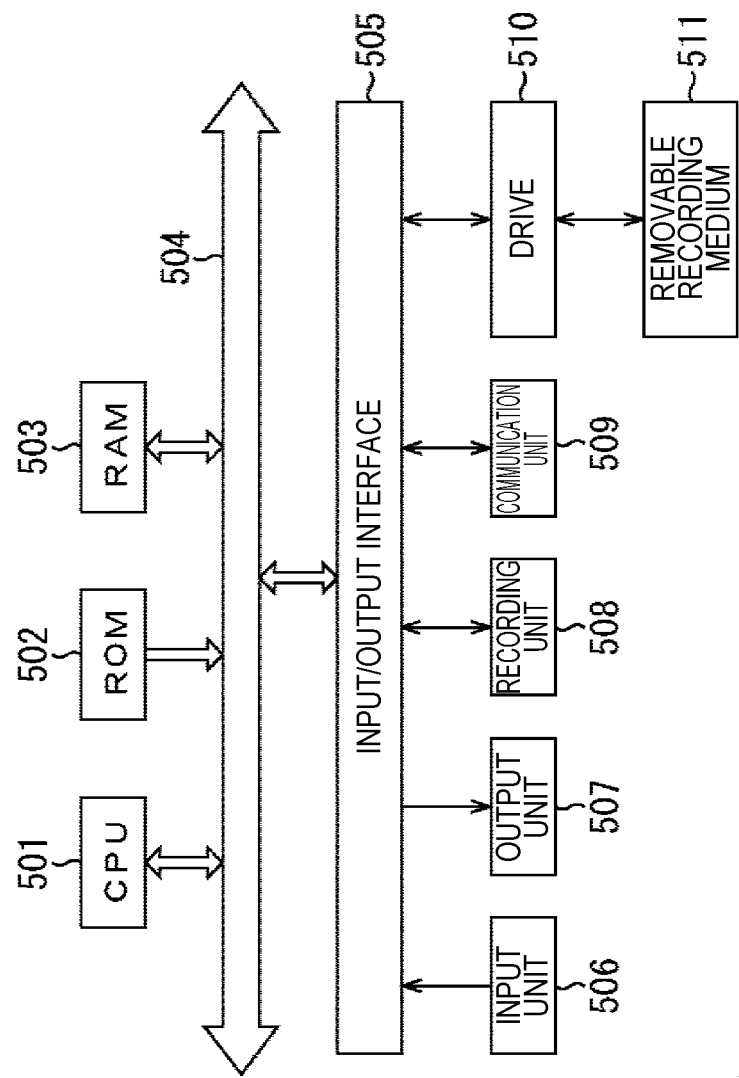

INFORMATION PROCESSING DEVICE AND METHOD, AND PROGRAM

TECHNICAL FIELD

The present technology relates to an information processing device and method and a program, and particularly to an information processing device and method and a program which enable a photographing position and a photographing attitude of a captured image to be inferred under a more lenient condition.

BACKGROUND ART

Applications such as bullet time and free viewpoint have been known from the past. In these applications, it is necessary to infer a photographing position and a photographing attitude of a captured image that is obtained by photographing a subject. In free viewpoint, for example, a photographing position and a photographing attitude of each of a plurality of captured images that are obtained by photographing a subject are inferred, and a captured image that is captured at an arbitrary virtual viewpoint position is generated through an interpolation process using the inference result and the captured images.

As such a technique of inferring a photographing position and a photographing attitude of a captured image, there is a technique of only using images, i.e., an image-based technique (e.g., refer to Non-Patent Literature 1). In a case in which a photographing position and a photographing attitude of a captured image to be processed in a 3-dimensional space are inferred using this technique, two captured images, of which photographing positions and photographing attitudes are known and the photographing positions in a 3-dimensional space are different from that of the captured image to be processed, are necessary.

That is, if the two captured images of which the photographing positions and the photographing attitudes in the 3-dimensional space are known are called reference captured images, positions of subject portions in the 3-dimensional space that correspond to feature points detected in the two reference captured images, in which the points correspond to each other in the images, can be calculated since the photographing positions and the photographing attitudes of the reference captured images are known. Thus, a photographing position and a photographing attitude of a captured image to be processed in the 3-dimensional space can be inferred on the basis of the calculated positions of the subject portions in the 3-dimensional space and positions of feature points of the captured image to be processed that correspond to the subject portions.

CITATION LIST

Non-Patent Literature

Non-Patent Literature 1: "Complete Solution Classification for the Perspective-Three-Point Problem" written by Xiao-Shan Gao and three more people, posted on the Internet at http://www.mmrc.iss.ac.cn/~xgao/paper/ieee.pdf [Accessed on Apr. 8, 2015]

DISCLOSURE OF INVENTION

Technical Problem

There are a variety of conditions under which photographing is performed at a plurality of positions, and inferring a positional relation between a plurality of photographing positions under such photographing conditions has been demanded.

The present technology takes the above circumstance into consideration, and aims to enable a photographing position and a photographing attitude of a captured image to be inferred under a more lenient condition.

Solution to Problem

An information processing method or a program according to an aspect of the present technology is an information processing method for inferring photographing positions and photographing attitudes of a plurality of captured images at least including a first captured image captured at a first photographing position and a first photographing attitude, a second captured image captured at a second photographing position and a second photographing attitude, and a third captured image captured at a third photographing position and a third photographing attitude, or a program, the information processing method including the steps of, in a case where the first photographing position and the first photographing attitude, and the second photographing position and the second photographing attitude in a reference space can be inferred: inferring a relative positional relation between the second photographing position and the third photographing position on the basis of a common corresponding point included in each of the second captured image and the third captured image; and inferring the first photographing position and the first photographing attitude, the second photographing position and the second photographing attitude, and the third photographing position and the third photographing attitude in the reference space on the basis of the relative positional relation between the second photographing position and the third photographing position and a common corresponding point included in each of the first captured image and the third captured image.

The second captured image and the third captured image can have the at least five or more common corresponding points.

A relative positional relation between the first photographing position and the third photographing position can be further inferred on the basis of the common corresponding point included in the first captured image and the third captured image respectively. The first photographing position and the first photographing attitude, the second photographing position and the second photographing attitude, and the third photographing position and the third photographing attitude in the reference space can be inferred on the basis of the relative positional relation between the second photographing position and the third photographing position and the relative positional relation between the first photographing position and the third photographing position.

The first captured image and the third captured image can have the at least five or more common corresponding points.

The third photographing position in the reference space can be inferred by calculating an intersection position between a first straight line which connects the second photographing position and the third photographing position and is determined on the basis of the relative positional relation between the second photographing position and the third photographing position, and a second straight line which connects the first photographing position and the third photographing position and is determined on the basis of the relative positional relation between the first photographing position and the third photographing position, or a position that is closest from the first straight line and the second straight line.

The third photographing attitude in the reference space can be inferred on the basis of at least one of an inference result of the third photographing attitude based on the common corresponding point included in each of the second captured image and the third captured image and an inference result of the third photographing attitude based on the common corresponding point included in each of the first captured image and the third captured image.

The third photographing position in the reference space can be inferred on the basis of the relative positional relation between the second photographing position and the third photographing position and a common corresponding point included in each of the first captured image, the second captured image, and the third captured image.

The first captured image, the second captured image, and the third captured image can be images captured by different photographing units.

The first captured image, the second captured image, and the third captured image can be images captured by the same photographing unit.

Predetermined image processing can be further performed on the basis of the third photographing position and the third photographing attitude in the reference space and the third captured image.

A reproduction process can be further performed using the first captured image, the second captured image, and the third captured image on the basis of a positional relation between the first photographing position, the second photographing position, and the third photographing position.

An information processing device according to an aspect of the present technology is an information processing device which infers photographing positions and photographing attitudes of a plurality of captured images at least including a first captured image captured at a first photographing position and a first photographing attitude, a second captured image captured at a second photographing position and a second photographing attitude, and a third captured image captured at a third photographing position and a third photographing attitude, the information processing device including, in a case where the first photographing position and the first photographing attitude, and the second photographing position and the second photographing attitude in a reference space can be inferred: a relative positional relation inferring unit configured to infer a relative positional relation between the second photographing position and the third photographing position on the basis of a common corresponding point included in each of the second captured image and the third captured image; and a position/attitude inferring unit configured to infer the first photographing position and the first photographing attitude, the second photographing position and the second photographing attitude, and the third photographing position and the third photographing attitude in the reference space on the basis of the relative positional relation between the second photographing position and the third photographing position and a common corresponding point included in each of the first captured image and the third captured image.

According to an aspect of the present technology, in image processing which infers photographing positions and photographing attitudes of a plurality of captured images at least including a first captured image captured at a first photographing position and a first photographing attitude, a second captured image captured at a second photographing position and a second photographing attitude, and a third captured image captured at a third photographing position and a third photographing attitude, in a case where the first photographing position and the first photographing attitude, and the second photographing position and the second photographing attitude in a reference space can be inferred, a relative positional relation between the second photographing position and the third photographing position is inferred on the basis of a common corresponding point included in each of the second captured image and the third captured image, and the first photographing position and the first photographing attitude, the second photographing position and the second photographing attitude, and the third photographing position and the third photographing attitude are inferred in the reference space on the basis of the relative positional relation between the second photographing position and the third photographing position and a common corresponding point included in each of the first captured image and the third captured image.

Advantageous Effects of Invention

According to an aspect of the present technology, a photographing position and a photographing attitude of a captured image can be inferred under a more lenient condition.

Note that the effects described here are not necessarily limited, and any effect that is desired to be described in the present disclosure may be exhibited.

BRIEF DESCRIPTION OF DRAWINGS

FIG. 7 is a diagram for describing conditions necessary for each inference technique.

FIG. 14 is a diagram illustrating an example of a configuration of a computer.

MODE(S) FOR CARRYING OUT THE INVENTION

Embodiments to which the present technology is applied will be described below with reference to the drawings.

First Embodiment

<Regarding Present Technology>

The present technology is designed to enable a photographing position and a photographing attitude at which a predetermined image is captured to be inferred on the basis of images captured at different positions in a space. The present technology can be applied to, for example, smartphones, digital cameras, personal computers, image processing systems that infer a photographing position and a photographing attitude of a captured image using cloud computing, and the like.

As a technique of enabling a photographing position and a photographing attitude of an image captured by a camera to be inferred with high accuracy, there is a technique in which only captured images are used, i.e., an image-based technique.

Figure 1:
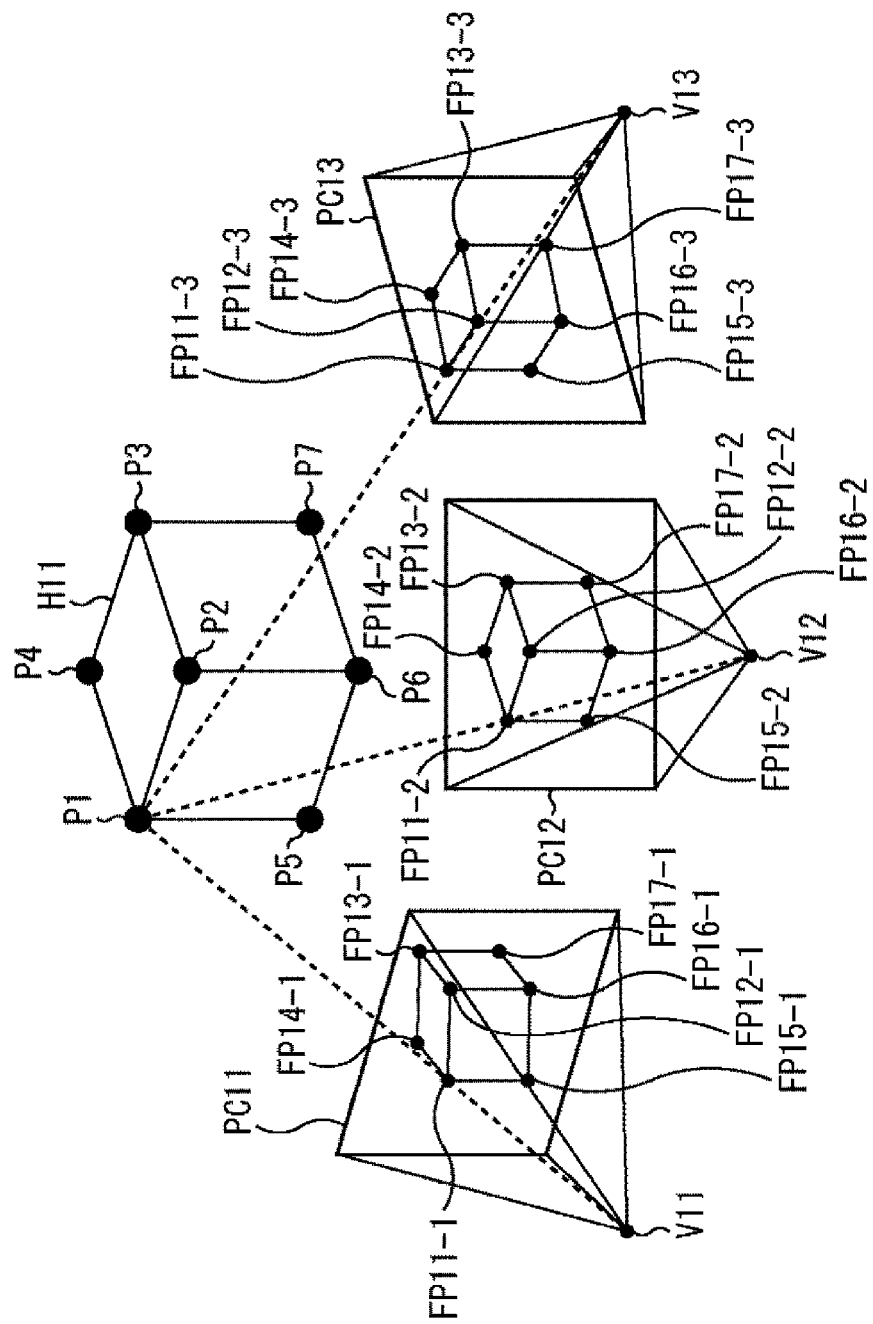
FIG. 1 is a diagram for describing a technique of inferring a photographing position and a photographing attitude on the basis of an image.

As illustrated in FIG. 1, for example, it is assumed that an object H11 of which a position and a shape in a predetermined reference space are known is captured at three difference positions V11 to V13 in a 3-dimensional space. Then, captured images PC11 to PC13 respectively having the positions V11 to V13 as viewpoints are assumed to be obtained as a result of the capturing.

Since the positions at which the captured images PC11 to PC13 are captured are different from each other in this example, an appearance of the object H11 serving as a subject differs in the captured images. However, feature points of the same portions of the object H11 are also detected in the captured images PC11 to PC13.

That is, feature points FP11-1 to FP17-1 respectively corresponding to portions P1 to P7 of the object H11 are detected in the captured image PC11 captured at the position V11. Here, positions of the portions P1 to P7 in the reference space are known.

Likewise, feature points FP11-2 to FP17-2 respectively corresponding to the portions P1 to P7 of the object H11 are detected in the captured image PC12 captured at the position V12. In addition, feature points FP11-3 to FP17-3 respectively corresponding to the portions P1 to P7 of the object H11 are detected in the captured image PC13 captured at the position V13.

In the case in which the position and the shape of the object H11 are known, as described above, if the captured images PC11 to PC13 have 4 or more feature points corresponding to the portions of the object H11, it is possible to uniquely determine photographing positions and photographing attitudes at which the captured images are obtained, i.e., photographing positions and photographing attitudes at which cameras obtain the captured images, using the image-based technique. A predetermined photographing position and photographing attitude of a camera when the camera captures an image at the photographing position and photographing attitude will be referred to as a photographing position and a photographing attitude of the captured image below.

Here, the photographing position and the photographing attitude of the captured image are a photographing position and a photographing attitude in a reference space that serves as a predetermined reference. In addition, the photographing attitude of the captured image is an attitude of the camera at which the image is captured, i.e., a photographing direction of the camera.

Further, the reference space is a space in which an arbitrary reference distance (scale) is set, for example, a distance between photographing positions at which two specific images are captured is set to 1. Thus, if the distance between the above-described photographing positions is set to have the same value as the distance in a real space, for example, the scale of the reference space is equal to the scale of the real space.

A photographing position in a reference space is, for example, a coordinate position at which an image is captured in a 3-dimensional coordinate system having a predetermined position in the reference space as an origin or the like. In addition, a photographing attitude in the reference space is, for example, angle information indicating a photographing direction of a camera when the camera captures an image or the like. Specifically, the photographing attitude includes, for example, a roll angle, a pitch angle, and a yaw angle of the photographing direction of a camera with respect to a predetermined reference direction when each of axes of the 3-dimensional coordinate system of the reference space are reference rotation axes (reference axes).

A photographing position and a photographing attitude of a captured image refer to a photographing position and a photographing attitude in the reference space in the description below. In addition, a relative photographing position and photographing attitude refer to a photographing position and a photographing attitude viewed from a photographing position and a photographing attitude of a predetermined captured image. Thus, a relative photographing position refers to, for example, a state in which a scale in the reference space is unknown, i.e., a state in which a direction in which the photographing position is oriented with respect to a predetermined position such as another photographing position is determined but a distance between the positions in the reference space is not determined.

Note that, in a case in which photographing positions and photographing attitudes of captured images are to be actually inferred, the position of the object H11 in the reference space is unknown and the photographing positions and the photographing attitudes of the plurality of captured images are generally sequentially inferred.

Figure 2:
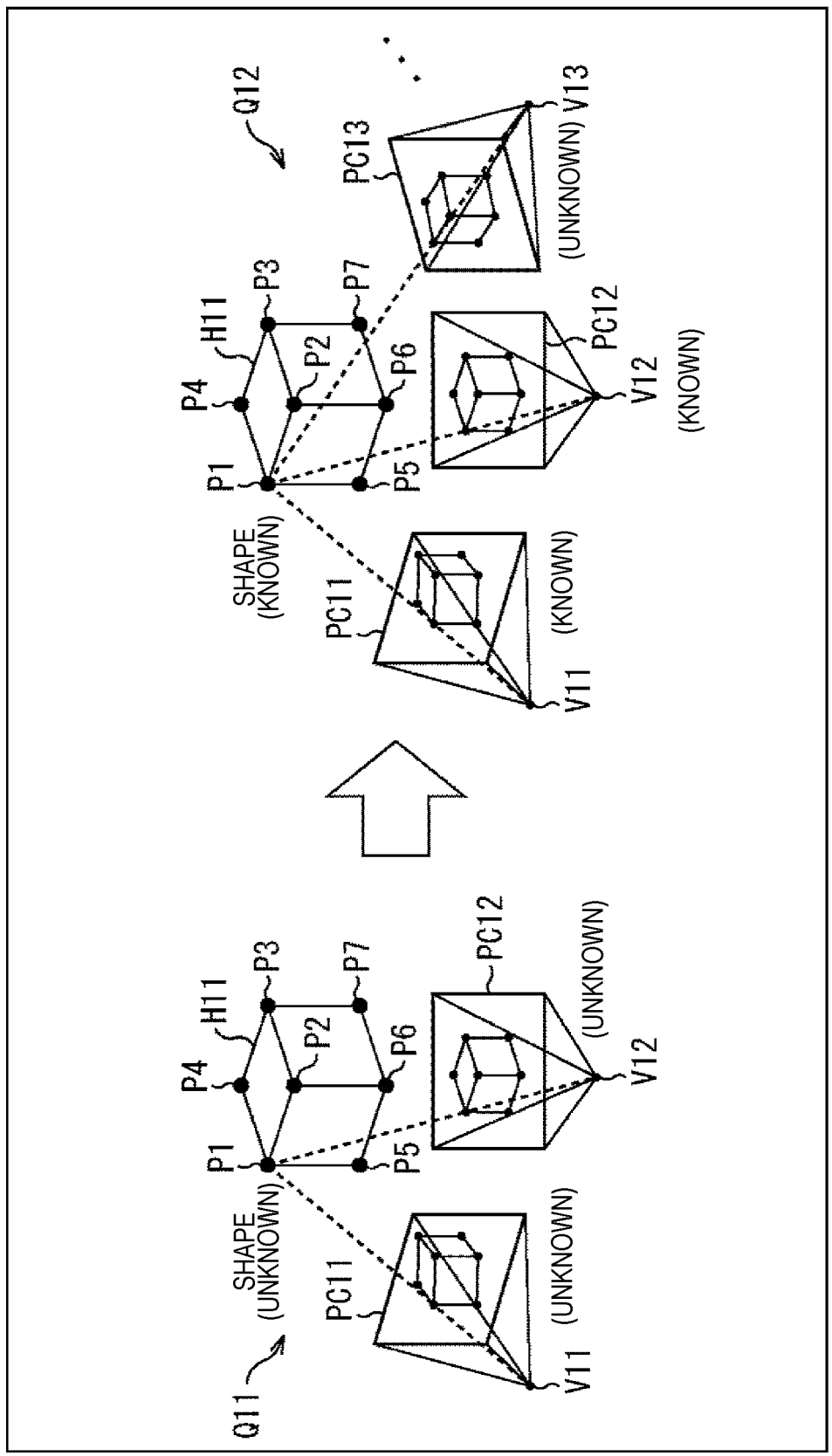
FIG. 2 is a diagram for describing a technique of inferring a photographing position and a photographing attitude on the basis of an image.

In such a case, for example, a relative photographing position and photographing attitude of a captured image are inferred on the basis of a positional relation between feature points detected in the captured image PC11 captured at the position V11 and the captured image PC12 captured at the position V12, as indicated by arrow Q11 of FIG. 2.

That is, a relative positional relation between the photographing position and the photographing attitude at which the captured image PC11 is captured and the photographing position and the photographing attitude at which the captured image PC12 is captured is inferred. Note that portions of FIG. 2 that correspond to those of FIG. 1 are given the same reference numerals, and description thereof will be omitted.

If five or more corresponding feature points are detected in each of the captured image PC11 and the captured image PC12 even though the position of the object H11 in the reference space is unknown, a positional relation of the cameras when each of the captured image PC11 and the captured image PC12 are captured, i.e., relative photographing positions and photographing attitudes of the two captured images, can be inferred.

In addition, positions of portions of the subject at which the corresponding feature points are detected, more specifically, positions relative to the respective photographing positions, can be inferred from the relative photographing positions and photographing attitudes obtained through the inference and the positions of the feature points in the respective captured images. Further, if a reference scale, i.e., scale of the reference space, is given, photographing positions and photographing attitudes of the respective captured images and the positions of the portions of the subject in the reference space can be determined.

If the position of the object H11 and the photographing positions and photographing attitudes of the captured images PC11 and PC12 in the reference space at which the images are captured are known, an unknown photographing position and photographing attitude of a captured image are then sequentially inferred using the positions of the portions of the subject in the reference space that are inferred until then, as indicated by arrow Q12.

For example, a photographing position and a photographing attitude of the captured image PC13 in the reference space at which the image is captured are inferred on the basis of the captured image PC13 and the positions of the portions of the object H11 calculated from the photographing positions and photographing attitudes at which the captured images PC11 and PC12 are captured.

In this case, if four or more corresponding feature points, i.e., four or more common feature points, are detected in each of the three captured images PC11, PC12, and PC13, the photographing position and the photographing attitude of the captured image PC13 in the reference space at which the image is captured are determined.

Here, this image-based technique for inferring a photographing position and a photographing attitude will be described in more detail. Note that the above-described image-based technique for inferring a photographing position and a photographing attitude that will be described below is also called a 4-common-point inference technique.

Further, the feature points detected in the plurality of captured images corresponding to the same portion of the subject are also particularly called corresponding points. For example, the feature points FP11-1 to FP11-3 that correspond to the same portion P1 are detected in the captured images PC11 to PC13 in the example illustrated in FIG. 1, and thus the corresponding feature points FP11-1 to FP11-3 are the corresponding points.

Figure 3:
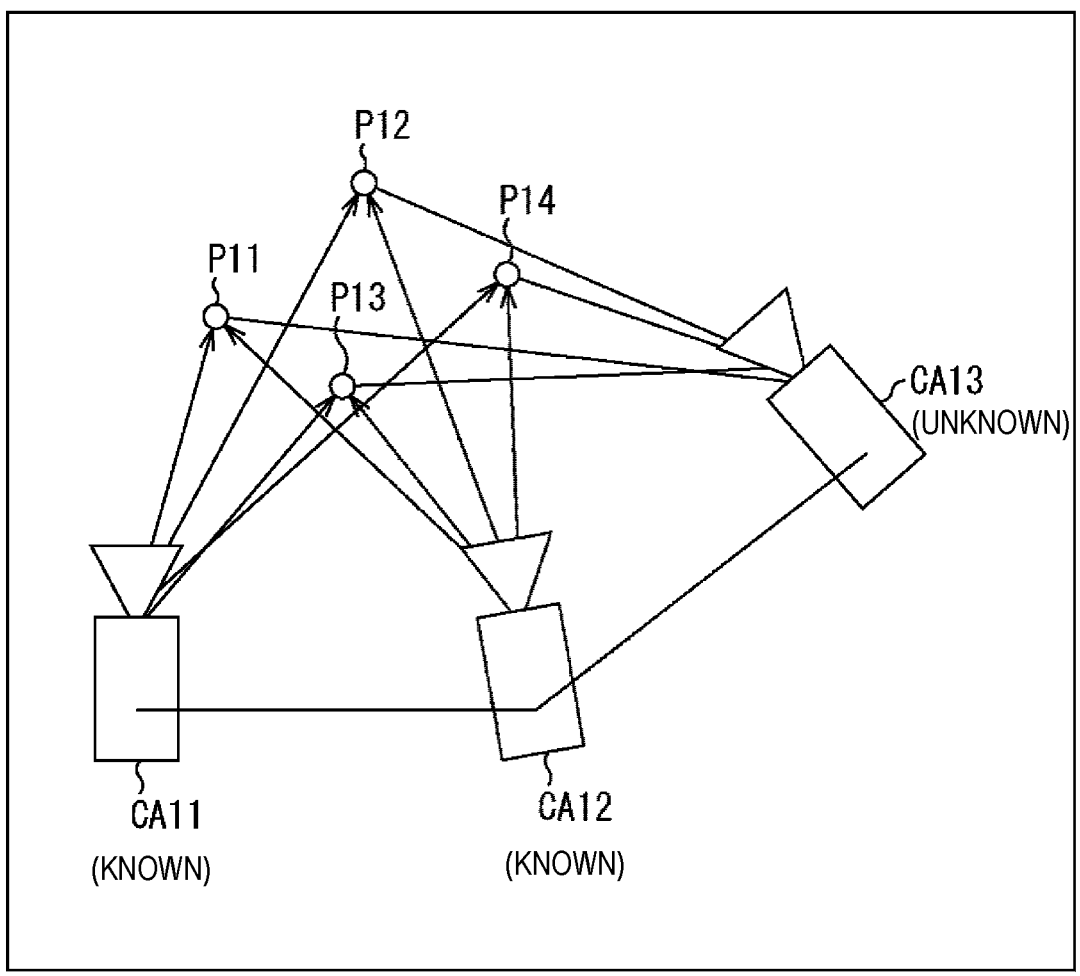
FIG. 3 is a diagram for describing a technique of inferring a photographing position and a photographing attitude on the basis of an image.

If four common corresponding points can be detected in three or more captured images in the 4-common-point inference technique, as illustrated in FIG. 3, for example, a photographing position and a photographing attitude of an unknown captured image can be inferred.

In this example, a camera CA11, a camera CA12, and a camera CA13 are disposed in a 3-dimensional space. Here, a photographing position and a photographing attitude of an image captured by the camera CA11 in the reference space, and a photographing position and a photographing attitude of an image captured by the camera CA12 in the reference space are assumed to be known. On the other hand, a photographing position and a photographing attitude of an image captured by the camera CA13 in the reference space are assumed to be unknown.

Note that the image captured by the camera CA11 will also be referred to as a captured image CA11 below. Likewise, the image captured by the camera CA12 will also be referred to as a captured image CA12, and the image captured by the camera CA13 will also be referred to as a captured image CA13.

Here, since four portions P11 to P14 of a subject of which positions in the reference space are known are each being observed by the cameras CA11 to CA13, four corresponding common points that in the captured images are obtained, and thus the photographing position and the photographing attitude of the captured image CA13 can be inferred therefrom.

Specifically, since the photographing positions and the photographing attitudes of the captured images CA11 and CA12 in the reference space are known, positions of the portions P11 to P14 of the subject in the reference space that can be observed in the captured images CA11 and CA12 are also known.

Next, any three portions are selected from the portions P11 to P14, and the photographing position and the photographing attitude of the captured image CA13 in the reference space are inferred from positional relations between positions of the three selected portions in the reference space and positions of feature points in the captured image CA13 corresponding to the three portions. At this time, about four positions and attitudes are obtained as candidates for the photographing position and the photographing attitude of the captured image CA13 in the reference space.

Furthermore, the remaining portion out of the portions P11 to P14 is re-projected on the captured image CA13 with respect to each of the four candidates on the basis of the photographing positions and the photographing attitudes of the captured image CA13 that were obtained as candidates and the position of the remaining one portion in the reference space.

Then, an error between the re-projection result and the position of the feature point corresponding to the one remaining portion out of the portions P11 to P14 on the captured image CA13 is calculated, and a candidate having a minimum error is set to a final photographing position and photographing attitude of the captured image CA13 in the reference space.

The image-based technique for inferring a photographing position and a photographing attitude (4-common-point inference technique) is described in detail in, for example, "Complete Solution Classification for the Perspective-Three-Point Problem" or the like.

In addition, a technique of determining a position and an attitude of a camera by re-projecting a portion of a subject is described in detail at, for example, the URL http://iplimage.com/blog/p3p-perspective-point-overview/or the like.

Note that, although the case in which the three captured images are used has been described here, a unknown photographing position and photographing attitude of a captured image may also be inferred from two or more captured images having common corresponding points of which photographing positions and photographing attitudes in a reference space are known, and one captured image of which a photographing position and a photographing attitude are unknown.

However, in a case in which feature points of captured images corresponding to each other, i.e., corresponding points, are to be detected, the corresponding points are detected normally in the following sequence. Here, a case in which corresponding points of a captured image A and another captured image B are detected, for example, will be described.

First, feature points of the captured image A and the captured image B are detected in each thereof in accordance with an algorithm such as Harris corner detection or scale-invariant feature transform (SIFT), and feature amounts of each of the feature points are extracted from surrounding areas of the feature points in the captured images.

Then, a distance between the feature amount of the feature points detected in the captured image A and the feature amount of the feature points detected in the captured image B is calculated, and pairs of feature points which satisfy a condition that the distance between the feature amounts is less than or equal to a threshold value are detected. Each of the pairs of feature points is a pair of which feature points have similar images in their surroundings to each other.

Next, a characteristic pair of feature points is extracted from the detected pairs of feature points. Here, the characteristic pair of feature points is a pair of feature points having a surrounding pattern (texture) of the feature points constituting the pair with a degree of similarity lower than a surrounding pattern of the other feature points. That is, in this process, a pair of feature points extracted from repetitive pattern portions of the captured images is eliminated to prevent incorrect association of the feature points.

Finally, a pair of feature points that are considered to be geometrically and statistically reasonable is extracted from the pairs of feature points that remain until then, and the feature points constituting the extracted pair of feature points are set as corresponding points that correspond to each other in captured images, i.e., feature points detected in the same portion.

Note that a method for extracting a series of reasonable pairs of feature points is described in detail in, for example, "Photo Tourism: Exploring Photo Collections in 3D" by Noah Snavely, Steven M. Seitz and Richard Szeliski, in ACM Transactions on Graphics (SIGGRAPH Proceedings), 25(3), 2006.

If corresponding points are detected in the above-described procedure, the number of feature points that are set as corresponding points may be small even when a large number of feature points are detected in the captured images.

Figure 4:
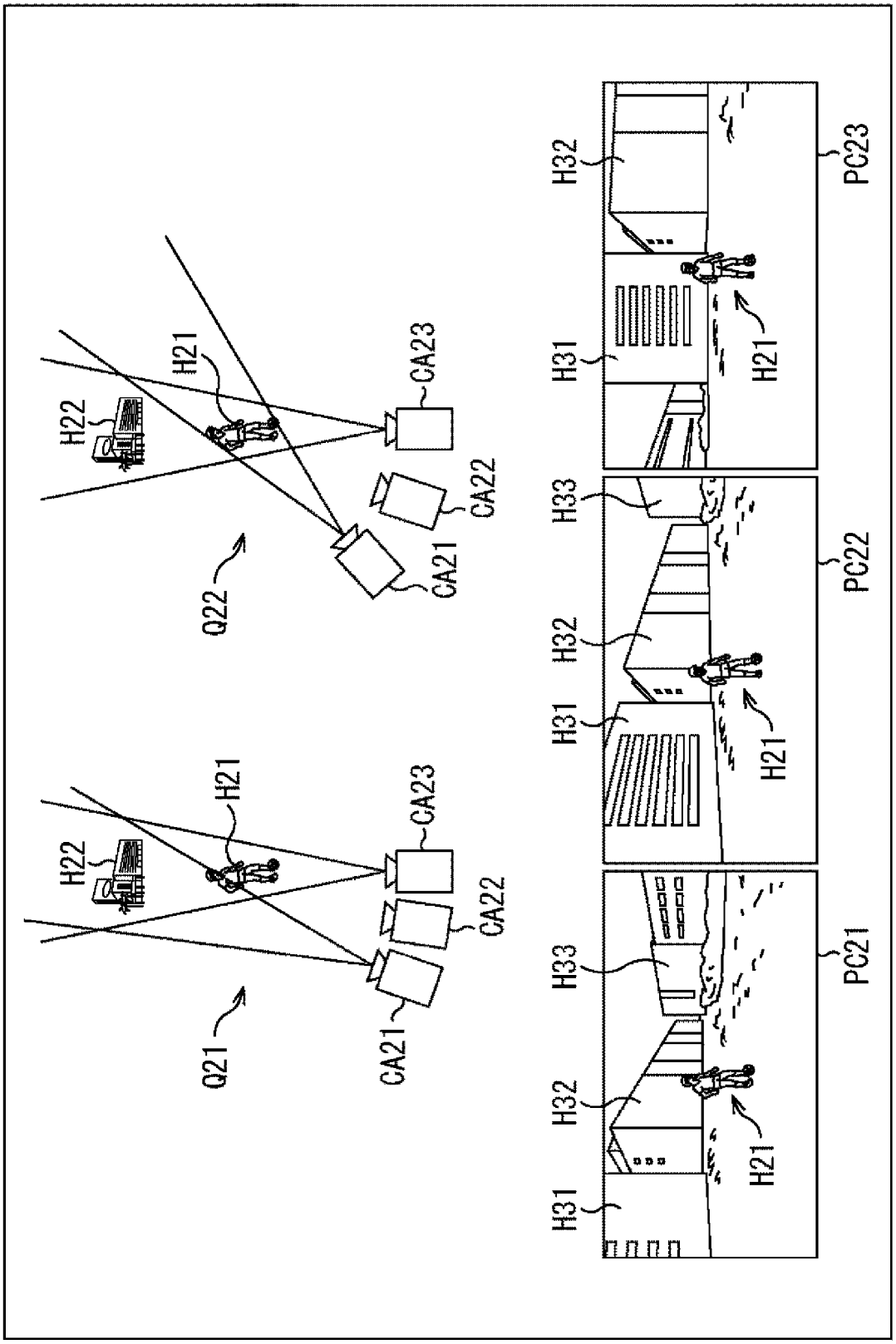
FIG. 4 is a diagram for describing distances between cameras and corresponding points between captured images.

It is assumed that, for example, three cameras CA21 to CA23 capture a main subject H21 and a background subject H22, as indicated by arrow Q21 of FIG. 4. Here, a person who is the subject H21 gazing at each of the cameras is assumed to be photographed, and the subject H22, which is in the background relative to the subject H21, is assumed to be distant therefrom.

At this time, in a case in which intervals of adjacent cameras among the camera CA21 to the camera CA23, i.e., angles formed by the cameras, are narrow, there is not much difference between an appearance of the subject H22 in the images captured by the cameras, and an area around the subject H22 commonly captured by the cameras is large. For these reasons, a photographing position and a photographing attitude of each of the captured images in a reference space can be reliably inferred on the basis of the captured images obtained by the cameras.

On the other hand, in a case in which the intervals of adjacent cameras are wide, as indicated by arrow Q22, for example, the appearance of the subject H22 changes in the images captured by the cameras, and the area around the subject H22 commonly projected by the cameras is small.

Specifically, it is assumed that, for example, the camera CA21 to the camera CA23 respectively obtain captured images PC21 to PC23 as a result of photographing performed in the state indicated by the arrow Q22. In this example, a subject H31 to a subject H33, which are buildings corresponding to the subject H22, are partly or entirely projected as subjects together with the subject H21 in each of the captured images.

That is, the captured image PC21 captured by the camera CA21 includes the subject H31 to the subject H33. In addition, the captured image PC22 captured by the camera CA22 that is adjacent to the camera CA21 also includes the subject H31 to the subject H33.

In the captured image PC22, however, appearances of the subject H31 to the subject H33 are significantly different from those in the captured image PC21, and for example, more than half of the subject H33 is not seen in the image.

In addition, when comparing the captured image PC21 with the captured image PC23, the captured image PC23 does not include the subject H33, and the appearances of the subject H31 and the subject H32 are significantly different in the captured images. Furthermore, it can also be ascertained that areas in which the same subjects are projected are small in the captured image PC21 and the captured image PC23.

In this case, a large amount of corresponding points are detected in each of the pair of the captured image PC21 and the captured image PC22 and the pair of the captured image PC22 and the captured image PC23 that are captured at adjacent positions. However, it is hard to detect corresponding points in the captured image PC21 and the captured image PC23 having very distant photographing positions, and four or more common corresponding points in the three captured images PC21 to PC23, which is a condition of the 4-common-point inference technique, may not be detected depending on the case.

In the 4-common-point inference technique in which four or more common corresponding points in three captured images are necessary as described above, it may not be possible to infer a photographing position and a photographing attitude in a reference space depending on a positional relation between the cameras, and thus a technique of inferring a photographing position and a photographing attitude with a more relaxed requirement has been desired. In other words, a mechanism which enables a photographing position and a photographing attitude to be inferred under a more lenient photographing condition has been desired.

Therefore, the present technology enables a photographing position and a photographing attitude of a captured image in a reference space to be inferred even under a more relaxed condition. In other words, the technology enables a photographing position and a photographing attitude to be inferred under a more lenient photographing condition In the present technology, specifically, for example, after relative photographing positions and photographing attitudes of captured images obtained by two cameras illustrated in FIG. 5 are inferred, a photographing position and a photographing attitude of a captured image in a reference space is inferred.

Figure 5:
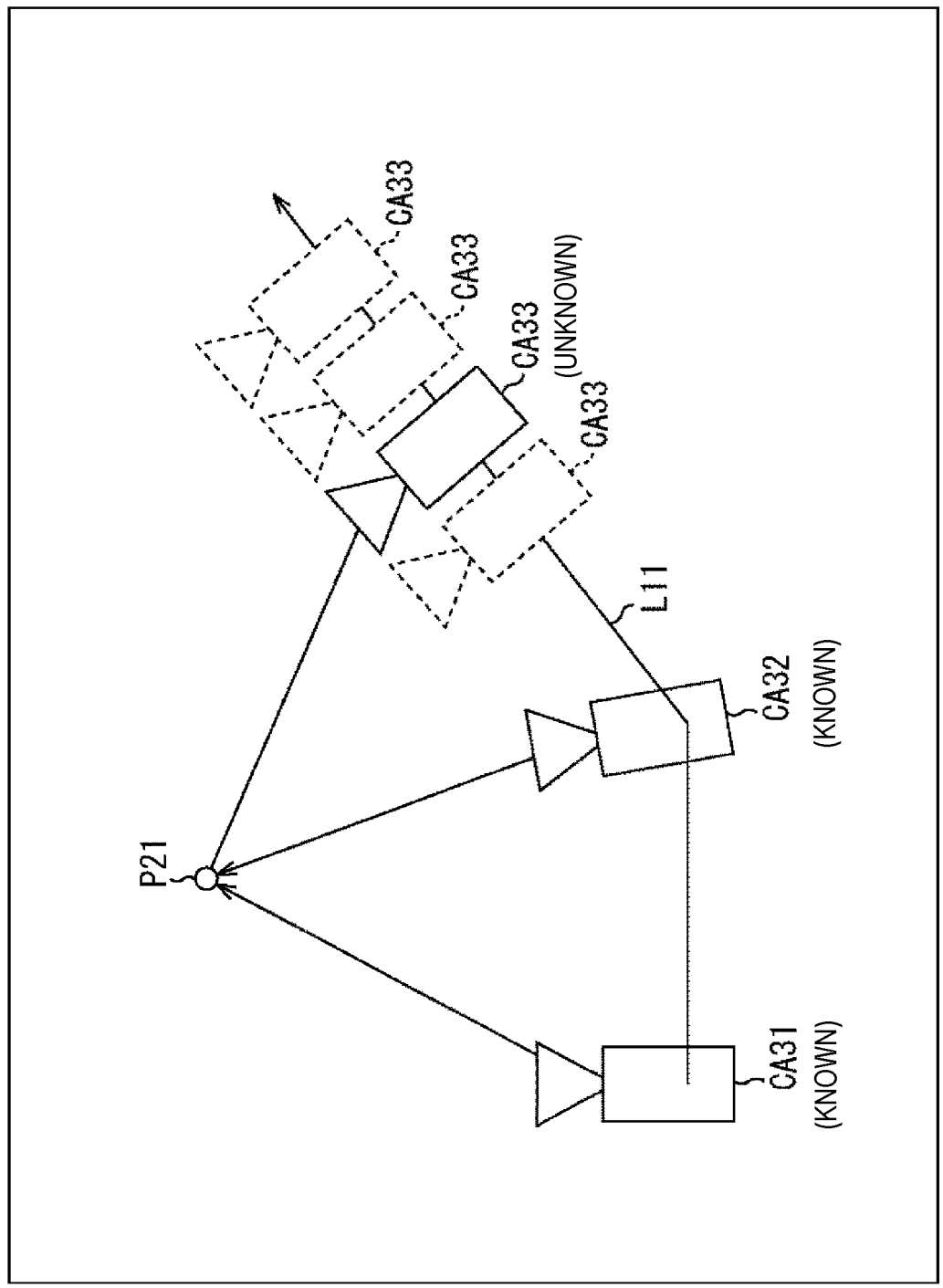
FIG. 5 is a diagram for describing a one-common-point inference technique.

In the example illustrated in FIG. 5, cameras CA31 to CA33 are disposed in a 3-dimensional space, and a portion P21 of a subject in the 3-dimensional space is observed by the cameras CA31 to CA33.

In addition, five or more common corresponding points in a captured image obtained by the camera CA32 and a captured image obtained by the camera CA33 are assumed to be detected, and one or more common corresponding points in each of captured images by the cameras CA31 to CA33 are assumed to be detected. In this example, a feature point of the portion P21 is the common corresponding point in each of the captured images obtained by the cameras CA31 to CA33.

Further, the captured image obtained by the camera CA31 will also be referred to as a captured image CA31, the captured image obtained by the camera CA32 as a captured image CA32, and the captured image obtained by the camera CA33 as a captured image CA33.

Photographing positions and photographing attitudes of the captured images CA31 and CA32 in the reference space are known at present, and an unknown photographing position and photographing attitude of the captured image CA33 will be inferred.

In this case, first, relative photographing positions and photographing attitudes of the captured images CA32 and CA33, each having five or more common corresponding points, when the captured images are captured are inferred on the basis of a positional relation between corresponding points of the captured image CA32 and corresponding points of the captured image CA33. At this point, the photographing position of the captured image CA33 is just a position relative to the photographing position of the captured image CA32, and is not a photographing position in the reference space.

However, since the photographing position and the photographing attitude of the captured image CA32 in the reference space are known, the photographing attitude of the captured image CA33 in the reference space is determined on the basis of the photographing attitude of the captured image CA32 in the reference space and a photographing attitude of the captured image CA33 relative to the captured image CA32.

In addition, since the photographing position of the captured image CA33 relative to the photographing position of the captured image CA32, i.e., a direction of the camera CA33 viewed from the camera CA32, is calculated through inference, a relative positional relation between the camera CA32, the camera CA33, and the portion P21 corresponding to the corresponding points in the reference space can be obtained.

That is, although a triangular shape obtained by connecting the positions of the camera CA32, the camera CA33, and the portion P21 is determined, a size (scale) of the triangle is not determined. In other words, although the position of the camera CA33 on a straight line L11 when viewed from the camera CA32 and the direction in which the portion P21 is positioned when viewed from the camera CA32 are known, distances from the camera CA32 to the camera CA33 and the portion P21 are not determined.

The photographing position of the captured image CA33 in the reference space is inferred in the above-described state on the basis of the captured images obtained by the three cameras CA31 to CA33, specifically, on the basis of one or more common corresponding points in the three captured images CA31 to CA33.

For example, since the photographing position and the photographing attitude of the captured image CA31, and the photographing position and the photographing attitude of the captured image CA32 in the reference space are known, a position of the portion P21 in the reference space corresponding to the corresponding points of the captured images can also be determined through inference. Then, the photographing position of the captured image CA33 in the reference space can be inferred on the basis of the captured image CA32 and the portion P21 of which the photographing positions in the reference space are known and the photographing position of the captured image CA33 relative to that of the captured image CA32.

For example, with the position of the camera CA33, i.e., the photographing position of the captured image CA33, set to a predetermined position on the straight line L11, an error between a projection position of the portion P21, of which the position in the reference space is known, when the portion is projected on the captured image CA33 and a position of a feature point (corresponding point) of the portion P21 when the portion is actually projected in the captured image CA33 is calculated. Then, a photographing position of the captured image CA33 that causes the error to have a minimum value is determined as the photographing position of the captured image CA33 in the reference space.

Note that the example in which the photographing positions and photographing attitudes of the captured image CA31 and the captured image CA32 in the reference space are known has been described here. However, the photographing positions and photographing attitudes of the captured image CA31 and the captured image CA32 may be unknown in the stage in which the relative photographing position and photographing attitude of the captured image CA33 are calculated, and the captured image CA31 and the captured image CA32 should be used to infer photographing positions and photographing attitudes thereof in the reference space. That is, the captured image CA31 and the captured image CA32 should be used to infer the photographing position and the photographing attitude of the captured image CA33 in the reference space using final photographing positions and photographing attitudes of the captured image CA31 to the captured image CA33. Specifically, for example, the photographing positions and photographing attitudes of the captured images CA31 to CA33 may be set to be inferred substantially at the same time in a state in which photographing positions and photographing attitudes of the captured images are unknown.

The technique of inferring a photographing position and a photographing attitude of a captured image described with reference to FIG. 5 will also be particularly referred to as a one-common-point inference technique.

In the one-common-point inference technique, if there is at least one captured image of which a photographing position and a photographing attitude in a reference space are known, the image having five or more common corresponding points in a captured image to be processed of which a photographing position and a photographing attitude are to be inferred and the captured image to be processed and two or more captured images, of which photographing positions and photographing attitudes in the reference space are known, have one or more common corresponding points, a photographing position and a photographing attitude of the captured image to be processed in the reference space can be inferred.

It can be ascertained that the condition for the one-common-point inference technique is more relaxed than the condition for the above-described four-common-point inference technique. Therefore, it can be ascertained that, according to the one-common-point inference technique, a photographing position and a photographing attitude of a captured image can be inferred under a more lenient photographing condition than in the four-common-point inference technique.

Note that, although the example in which there are two captured images of which photographing positions and photographing attitudes are known in the reference space has been described above, a photographing position and a photographing attitude of the captured image CA33 may be inferred on the basis of photographing positions and photographing attitudes of two or more captured images as long as the above-described condition can be satisfied.

In addition, although the example in which the relative photographing positions and photographing attitudes of the captured image CA32 and the captured image CA33 are inferred has been described here, for example, relative photographing positions and photographing attitudes of the captured image CA31 and the captured image CA33 may also be inferred.

Furthermore, the camera CA31 to the camera CA33 may be the same camera, and some or all of the cameras may be different cameras. For example, the camera CA31 to the camera CA33 are the same camera in a case in which one camera produces captured images at positions at different times while moving.

Figure 6:
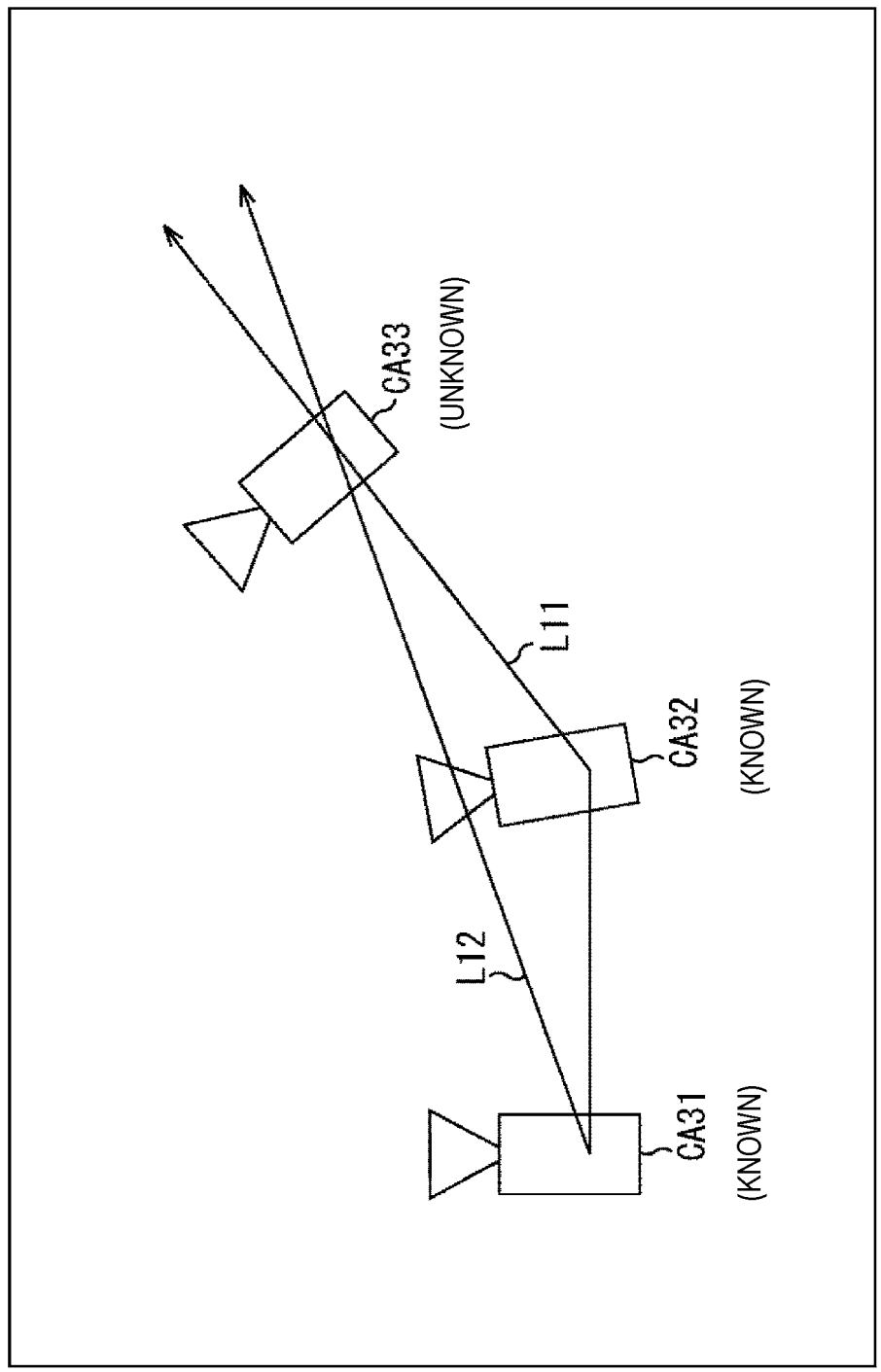
FIG. 6 is a diagram for describing a zero-common-point inference technique.

In addition, for example, since a photographing position and photographing attitude of a captured image to be processed relative to known photographing positions and photographing attitudes of two captured images in a reference space may be inferred, as illustrated in FIG. 6, a photographing position and a photographing attitude of the captured image to be processed in the reference space may be inferred from relative photographing positions and photographing attitudes of the captured images. Note that parts of FIG. 6 corresponding to those of FIG. 5 are given the same reference numerals, and description thereof will be appropriately omitted.

In the example illustrated in FIG. 6, photographing positions and photographing attitudes of the camera CA31 and the camera CA32 in the reference space, i.e., photographing positions and photographing attitudes of the captured image CA31 and the captured image CA32 in the reference space, are known. In addition, a photographing position and a photographing attitude of the camera CA33 in the reference space, i.e., those of the captured image CA33, are unknown.

In addition, five or more common corresponding points in the captured image CA31 and the captured image CA33 are detected, and likewise, five or more common corresponding points in the captured image CA32 and the captured image CA33 are detected.

In this case, first, a photographing position and photographing attitude of the captured image CA33 relative to a photographing position and photographing attitude of the captured image CA32 are inferred as in the one-common-point inference technique. As a result, it is ascertained that the camera CA33 is positioned on the straight line L11 when viewed from the camera CA32.

Furthermore, a photographing position and photographing attitude of the captured image CA33 relative to a photographing position and photographing attitude of the captured image CA31 are inferred on the basis of a positional relation between the corresponding points of the captured image CA31 and the corresponding points of the captured image CA33, as in the case of the captured image CA32. As a result, it is ascertained that the camera CA33 is positioned on a straight line L12 when viewed from the camera CA31.

If the photographing position of the captured image CA33 relative to that of the captured image CA32 and the photographing position of the captured image CA33 relative to that of the captured image CA31 are ascertained, it can be ascertained that the camera CA33 is present at an intersection of the straight lines L11 and L12 in the reference space from the above-described relative positional relations. That is, the photographing position of the captured image CA33 in the reference space can be ascertained.

In addition, the photographing attitude of the captured image CA33 in the reference space can also be determined using at least one of the relative photographing attitude of the captured image CA33 inferred from those of the captured image CA32 and the captured image CA33, and the relative photographing attitudes of the captured image CA33 inferred from those of the captured image CA31 and the captured image CA33.

Note that the example in which the photographing positions and photographing attitudes of the captured image CA31 and the captured image CA32 in the reference space are known has been described here. However, the photographing positions and photographing attitudes of the captured image CA31 and the captured image CA32 may be unknown in the stage in which the relative photographing position and photographing attitude of the captured image CA33 are calculated from the captured image CA31 and the captured image CA32, and the captured image CA31 and the captured image CA32 should be used to infer photographing positions and photographing attitudes thereof. That is, the captured image CA31 and the captured image CA32 should be used to infer the photographing position and the photographing attitude of the captured image CA33 in the reference space using final photographing positions and photographing attitudes of the captured image CA31 to the captured image CA33. Specifically, for example, the photographing positions and photographing attitudes of the captured images CA31 to CA33 may be set to be inferred substantially at the same time in a state in which photographing positions and photographing attitudes of the captured images are unknown.

The technique of inferring a photographing position and a photographing attitude of a captured image described with reference to FIG. 6 will also be particularly referred to as a zero-common-point inference technique.

In the zero-common-point inference technique, if there is at least two or more captured image of which a photographing position and a photographing attitude in a reference space are known, the image having five or more common corresponding points in a captured image to be processed of which a photographing position and a photographing attitude are to be inferred, a photographing position and a photographing attitude of the captured image to be processed in the reference space can be inferred.

It can be ascertained that the condition for the zero-common-point inference technique is more relaxed than the condition for the above-described four-common-point inference technique. Therefore, it can be ascertained that, according to the zero-common-point inference technique, a photographing position and a photographing attitude of a captured image can be inferred under a more lenient photographing condition than in the four-common-point inference technique.

Note that, although the example in which there are two captured images of which photographing positions and photographing attitudes are known in the reference space has been described above, a photographing position and a photographing attitude of the captured image CA33 in a reference space may be inferred on the basis of photographing positions and photographing attitudes of two or more captured images as long as the above-described condition can be satisfied.

Furthermore, the camera CA31 to the camera CA33 may be the same camera in this case as well, and some or all of the cameras may be different cameras.

According to the above-described one-common-point inference technique and the zero-common-point inference technique, which are techniques for inferring a position and an attitude to which the present technology is applied, as indicated in FIG. 7, a photographing position and a photographing attitude of a captured image can be inferred under a more relaxed condition, i.e., a more lenient photographing condition, than in the four-common-point inference technique.

FIG. 7 shows conditions of the inference techniques that are necessary for inferring a photographing position and a photographing attitude of a captured image to be processed in a reference space using two captured images of which photographing positions and photographing attitudes in the reference space are known.

That is, in the four-common-point inference technique, although the number of common corresponding points in two captured images is not fixed, the number of common corresponding points in three captured images is four or more.

Meanwhile, in the one-common-point inference technique, the number of common corresponding points in three captured images may be one, and the number of common corresponding points in a captured image to be processed and another captured image is five or more.

Since common corresponding points are generally more likely to be present in two captured images than in three captured images, a condition for implementing the one-common-point inference technique can be more relaxed than that for implementing the four-common-point inference technique. Thus, a photographing position and a photographing attitude of a captured image in a reference space can be inferred under a more lenient photographing condition in the one-common-point inference technique than in the four-common-point inference technique.

In addition, in the zero-common-point inference technique, common corresponding points in three captured images are not necessary, but rather five or more common corresponding points in a captured image to be processed and two other captured images are necessary. Because this condition is also more relaxed than that of the four-common-point inference technique, a photographing position and a photographing attitude of a captured image in a reference space can be inferred in the zero-common-point inference technique under a more lenient photographing condition than in the four-common-point inference technique.

<Example of Configuration of Image Processing Device>

Figure 8:
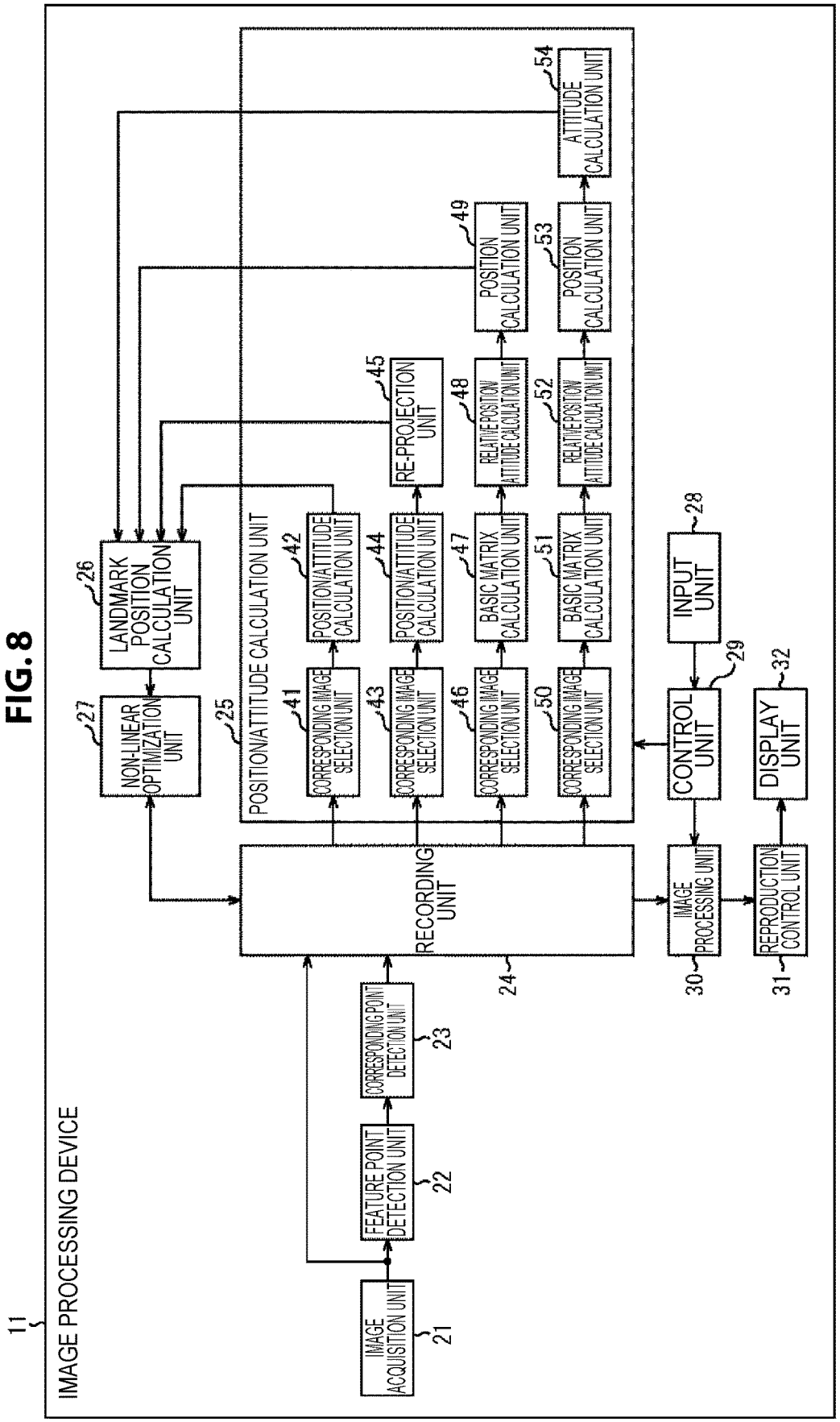
FIG. 8 is a diagram illustrating an example of a configuration of an image processing device.

Next, a more specific embodiment to which the above-described present technology is applied will be described. FIG. 8 is a diagram illustrating an example of a configuration of an image processing device to which the present technology is applied.

An image processing device 11 has an image acquisition unit 21, a feature point detection unit 22, a corresponding point detection unit 23, a recording unit 24, a position/attitude calculation unit 25, a landmark position calculation unit 26, a non-linear optimization unit 27, an input unit 28, a control unit 29, an image processing unit 30, a reproduction control unit 31, and a display unit 32.

The image acquisition unit 21 is constituted by, for example, one or a plurality of cameras (photographing units), obtains captured images by capturing a nearby subject, and supplies the captured images to the feature point detection unit 22 and the recording unit 24.

Specifically, in the case in which the image acquisition unit 21 is constituted by one camera, the camera obtains captured images at different positions at different times. In the example illustrated in FIG. 5, for example, one camera performs photographing as the camera CA31, then performs photographing as the camera CA32, then further performs photographing as the camera CA33, and sequentially performs photographing at different positions thereafter.

In addition, in the case in which the image acquisition unit 21 is constituted by a plurality of cameras, the plurality of cameras are respectively disposed at different positions, and the cameras perform photographing at the same time or at different times. In the example illustrated in FIG. 5, for example, the image acquisition unit 21 is constituted by the plurality of cameras including the camera CA31 to the camera CA33.

Furthermore, the image acquisition unit 21 may be configured as a communication unit so that the image acquisition unit 21 may acquire captured images from another device such as a server via a communication network or the like. In addition, the image acquisition unit 21 will be assumed to be constituted by a plurality of cameras below, and a photographing position and a photographing attitude of a camera when the camera obtains a captured image will be simply referred to as a photographing position and a photographing attitude of a captured image.

The feature point detection unit 22 detects feature points from the captured images supplied from the image acquisition unit 21 and supplies the detection result to the corresponding point detection unit 23. The corresponding point detection unit 23 detects corresponding feature points in a pair of any two captured images, i.e., corresponding points, on the basis of the feature point detection result supplied from the feature point detection unit 22, and then supplies the detection result to the recording unit 24.

The recording unit 24 is constituted by, for example, a volatile or non-volatile memory, records the captured images supplied from the image acquisition unit 21, and also records the corresponding point detection result supplied from the corresponding point detection unit 23 as corresponding point information.

In addition, the recording unit 24 records information indicating positions of the corresponding points in the captured images and positions of real portions (which will also be referred to as landmarks) of a subject in a reference space corresponding to the corresponding points and the information supplied from the non-linear optimization unit 27 as landmark information, and records information indicating photographing positions and photographing attitudes of the captured images in the reference space supplied from the non-linear optimization unit 27 as position/attitude information.

Furthermore, the recording unit 24 supplies necessary information among the various kinds information including the recorded captured images, the corresponding point information, the landmark information, and the position/attitude information to the position/attitude calculation unit 25, the non-linear optimization unit 27, or the image processing unit 30.

The position/attitude calculation unit 25 calculates photographing positions and photographing attitudes of the captured images recorded in the recording unit 24 in the reference space and supplies the calculation result to the landmark position calculation unit 26.

The position/attitude calculation unit 25 has a corresponding image selection unit 41, a position/attitude calculation unit 42, a corresponding image selection unit 43, a position/attitude calculation unit 44, a re-projection unit 45, a corresponding image selection unit 46, a basic matrix calculation unit 47, a relative position/attitude calculation unit 48, a position calculation unit 49, a corresponding image selection unit 50, a basic matrix calculation unit 51, a relative position/attitude calculation unit 52, a position calculation unit 53, and an attitude calculation unit 54.

The corresponding image selection unit 41 selects the pair of captured images having highest reliability among pairs of captured images on the basis of the corresponding point information recorded in the recording unit 24, reads corresponding point information of the pair from the recording unit 24, and then supplies the information to the position/attitude calculation unit 42. Here, the reliability of the pair of captured images is determined on the basis of, for example, the number of corresponding points, whether various feature points of distances are included, i.e., a percentage of corresponding points that are difficult to express with one projective transformation, a combination thereof, or the like. For example, the greater the number of corresponding points is, the higher the reliability is.

The position/attitude calculation unit 42 calculates photographing positions and photographing attitudes of the captured images in the reference space on the basis of the corresponding point information supplied from the corresponding image selection unit 41 and supplies the calculation result and the corresponding point information to the landmark position calculation unit 26.

Photographing positions and photographing attitudes of the first two captured images in the reference space are calculated through the corresponding image selection unit 41 and the position/attitude calculation unit 42 in a state in which any position of a landmark in the reference space is not calculated.

The corresponding image selection unit 43 selects captured images that satisfy the condition of the four-common-point inference technique on the basis of the landmark information recorded in the recording unit 24 or the like. In addition, the corresponding image selection unit 43 reads landmark information to be used in calculation of photographing positions and photographing attitudes of the selected captured images from the recording unit 24 and supplies the information to the position/attitude calculation unit 44.

The position/attitude calculation unit 44 calculates candidates for the photographing positions and photographing attitudes of the captured images in the reference space on the basis of the landmark information supplied from the corresponding image selection unit 43 and supplies the calculation result and the landmark information to the re-projection unit 45. The re-projection unit 45 determines the photographing positions and photographing attitudes of the captured images in the reference space on the basis of the calculation result and the landmark information supplied from the position/attitude calculation unit 44, and then supplies the determination result to the landmark position calculation unit 26.

The photographing positions and photographing attitudes of the captured images in the reference space are calculated through the corresponding image selection unit 43 to the re-projection unit 45 using the four-common-point inference technique.

The corresponding image selection unit 46 selects captured images (cameras) to be used in calculation of a photographing position and a photographing attitude of a captured image to be processed in the reference space using the one-common-point inference technique and a landmark of which a position is known on the basis of the corresponding point information recorded in the recording unit 24. In addition, the corresponding image selection unit 46 reads the corresponding point information, the position/attitude information, and the landmark information from the recording unit 24 in accordance with the selection result, and supplies the information to the basic matrix calculation unit 47.

The basic matrix calculation unit 47 calculates a basic matrix on the basis of the corresponding point information supplied from the corresponding image selection unit 46 and supplies the calculation result, the corresponding point information, the position/attitude information, and the landmark information to the relative position/attitude calculation unit 48. The relative position/attitude calculation unit 48 calculates a relative photographing position and photographing attitude of the captured image to be processed on the basis of the basic matrix supplied from the basic matrix calculation unit 47, and then supplies the calculation result, the corresponding point information, the position/attitude information, and the landmark information to the position calculation unit 49.

The position calculation unit 49 calculates a photographing position of the captured image in the reference space on the basis of the calculation result of the relative photographing position and photographing attitude, the position/attitude information, and the landmark information supplied from the relative position/attitude calculation unit 48, and then supplies the calculation result of the photographing position and the photographing attitude of the captured image in the reference space obtained as the result of the calculation, and the corresponding point information to the landmark position calculation unit 26.

The photographing position and the photographing attitude of the captured image in the reference space are calculated through the corresponding image selection unit 46 to the position calculation unit 49 using the one-common-point inference technique.

The corresponding image selection unit 50 selects captured images (cameras) to be used in calculation of the photographing position and the photographing attitude of the captured image to be processed using the zero-common-point inference technique on the basis of the corresponding point information recorded in the recording unit 24. Then, the corresponding image selection unit 50 reads the corresponding point information and the position/attitude information from the recording unit 24 in accordance with the selection result, and then supplies the information to the basic matrix calculation unit 51.

The basic matrix calculation unit 51 calculates a basic matrix on the basis of the corresponding point information supplied from the corresponding image selection unit 50 and supplies the calculation result, the corresponding point information and the position/attitude information to the relative position/attitude calculation unit 52. The relative position/attitude calculation unit 52 calculates a relative photographing position and photographing attitude of the captured image to be processed on the basis of the basic matrix supplied from the basic matrix calculation unit 51, and then supplies the calculation result, the corresponding point information and the position/attitude information to the position calculation unit 53.

The position calculation unit 53 calculates the photographing position of the captured image in the reference space on the basis of the calculation result of the relative photographing position and photographing attitude and the position/attitude information supplied from the relative position/attitude calculation unit 52, and then supplies the photographing position of the captured image in the reference space obtained as a calculation result, the relative photographing attitude, the corresponding point information, and the position/attitude information to the attitude calculation unit 54.

The attitude calculation unit 54 determines the photographing attitude of the captured image in the reference space on the basis of the relative photographing attitude of the captured image and the position/attitude information supplied from the position calculation unit 53, and then supplies the calculation results of the photographing position and the photographing attitude of the captured image in the reference space obtained as a result of the calculations and the corresponding point information to the landmark position calculation unit 26.

The photographing position and the photographing attitude of the captured image in the reference space are calculated through the corresponding image selection unit 50 to the attitude calculation unit 54 using the zero-common-point inference technique.

In addition, the landmark position calculation unit 26 calculates a position of the landmark in the reference space on the basis of the calculation results of the photographing positions and the photographing attitudes of the captured images in the reference space and the like supplied from the position/attitude calculation unit 42, the re-projection unit 45, the position calculation unit 49, or the attitude calculation unit 54. At this time, the landmark position calculation unit 26 acquires position/attitude information and the like indicating a known photographing position and photographing attitude of the captured image from the recording unit 24 via the non-linear optimization unit 27 to use the information in the calculation of the position of the landmark when necessary. Further, the landmark position calculation unit 26 supplies the calculation results of the photographing positions and the photographing attitudes of the captured images in the reference space, the corresponding point information, and the calculation result of the position of the landmark to the non-linear optimization unit 27.

The non-linear optimization unit 27 performs non-linear optimization on the basis of the calculation results of the photographing positions and the photographing attitudes of the captured images in the reference space, the corresponding point information, and the calculation result of the position of the landmark supplied from the landmark position calculation unit 26 to optimize the photographing positions and the photographing attitudes of the captured images in the reference space and the position of the landmark. The non-linear optimization unit 27 supplies position/attitude information and landmark information obtained through the non-linear optimization to the recording unit 24 to be recorded therein.

The input unit 28 is constituted by, for example, a mouse, a button, a touch panel, and the like and supplies operation signals according to operations of a user or the like to the control unit 29.

The control unit 29 controls overall operations of the image processing device 11 on the basis of the operation signal supplied from the input unit 28. The control unit 29 causes, for example, the position/attitude calculation unit 25 to calculate a photographing position and a photographing attitude of a captured image in the reference space and the image processing unit 30 to execute predetermined image processing.

The image processing unit 30 performs the predetermined image processing on the basis of the captured images recorded in the recording unit 24 and the position/attitude information, and thereby generates a reproduction image, which is an image for reproduction. Here, the reproduction image may be a moving image obtained from the captured images or a still image.

The image processing unit 30 supplies the generated reproduction image to the reproduction control unit 31. The reproduction control unit 31 supplies the reproduction image supplied from the image processing unit 30 to the display unit 32 to cause the reproduction image to be reproduced. The display unit 32 is constituted by, for example, a liquid crystal display and the like and reproduces the reproduction image in accordance with control of the reproduction control unit 31.

<Description of Reproduction Process>

Next, an operation of the image processing device 11 will be described.

When, for example, a user or the like operates the input unit 28 to instruct that a reproduction image be reproduced, the image processing device 11 starts a reproduction process in accordance with the instruction of the user or the like and generates and reproduces the reproduction image. The reproduction process performed by the image processing device 11 will be described with reference to a flowchart of FIG. 9 below.

In Step S11, the image acquisition unit 21 acquires a plurality of captured images and supplies the images to the feature point detection unit 22 and the recording unit 24. For example, the image acquisition unit 21 acquires the captured images by capturing images at different positions using a plurality of cameras. In addition, the recording unit 24 records the captured images supplied from the image acquisition unit 21.

In Step S12, the feature point detection unit 22 detects feature points in each of the plurality of captured images supplied from the image acquisition unit 21 and supplies the detection result to the corresponding point detection unit 23.

For example, the feature point detection unit 22 detects the feature points in the captured images in accordance with a Harris corner detection algorithm, a SIFT algorithm, or the like, extracts feature amounts of the feature points from the captured images, and outputs positions of the feature points in the captured images and the feature amounts of the feature points as the feature point detection result.

In Step S13, the corresponding point detection unit 23 detects corresponding points in each pair of captured images on the basis of the detection result of the feature points in the captured images supplied from the feature point detection unit 22 and supplies the detection result to the recording unit 24. In addition, the recording unit 24 records the detection result of the corresponding points supplied from the corresponding point detection unit 23 as corresponding point information.

For example, the corresponding point detection unit 23 selects an arbitrary pair of two captured images and selects a pair of feature points in which a distance of the feature amounts between the captured images making the pair is less than or equal to a threshold value. In addition, the corresponding point detection unit 23 extracts a characteristic pair of the feature points from the detected pair of feature points, extracts a pair of feature points that are geometrically and statistically reasonable from the extracted pair of feature points, and then sets the extracted pair of feature points as a pair of corresponding points.

As described above, the corresponding point detection unit 23 detects all combinations corresponding points of two captured images with respect to all of the captured images acquired by the image acquisition unit 21.

In Step S14, the corresponding image selection unit 41 selects the pair of captured images having highest reliability among pairs of captured images on the basis of the corresponding point information recorded in the recording unit 24, reads corresponding point information of the pair from the recording unit 24, and then supplies the information to the position/attitude calculation unit 42. Here, the reliability of the pair of captured images is determined on the basis of, for example, the number of corresponding points, whether various feature points of distances are included, i.e., a percentage of corresponding points that are difficult to express with one projective transformation, a combination thereof, or the like. For example, the greater the number of corresponding points is, the higher the reliability is.

Thereby, the two captured images with the highest reliability are selected. In other words, the first two captured images to be processed are selected in the state in which any position of a landmark in the reference space is not calculated.

In Step S15, the position/attitude calculation unit 42 calculates photographing positions and photographing attitudes of the captured images making the pair in the reference space when the captured images are captured on the basis of the corresponding point information from the corresponding image selection unit 41 and supplies the calculation result and the corresponding point information to the landmark position calculation unit 26.

Specifically, the position/attitude calculation unit 42 calculates a basic matrix on the basis of the corresponding point information with respect to the two captured images making the pair and calculates relative photographing positions and photographing attitudes when each of the two captured images making the pair is captured by decomposing the basic matrix. Then, for example, the position/attitude calculation unit 42 determines photographing positions and photographing attitudes of the two captured images in the reference space using the calculated relative photographing positions and photographing attitudes of the two captured images by setting an appropriate scale of the reference space.

Note that a method of inferring a photographing positions and a photographing attitude of a captured image by calculating a basic matrix is described in detail in, for example, "Multiple View Geometry in Computer Vision" written by Richard Hartley and Andrew Zisserman, and the like.

In Step S16, the landmark position calculation unit 26 calculates a position of a landmark in the reference space on the basis of the calculation result of the photographing positions and the photographing attitudes of the two captured images and the corresponding point information supplied from the position/attitude calculation unit 42.

The landmark position calculation unit 26 calculates the position of the landmark using, for example, stereoscopy or the like. Specifically, for example, a ray vector that connects a viewpoint of a camera with respect to the two captured images in the reference space and a corresponding point on a projection plane is calculated for each of corresponding points, and an intersection of the ray vectors that are calculated for each of the two captured images is set as the position of the landmark in the reference space. Note that, when two ray vectors do not have an intersection, a position in the closest distance from the two ray vectors is set as the position of the landmark in the reference space.

The landmark position calculation unit 26 supplies the calculation result of the position of the landmark, the calculation result of the photographing positions and the photographing attitudes of the captured images, and the corresponding point information to the non-linear optimization unit 27.

In Step S17, the non-linear optimization unit 27 performs non-linear optimization on the basis of the calculation result of the photographing positions and the photographing attitudes of the captured images from the landmark position calculation unit 26, the corresponding point information, and the calculation result of the position of the landmark.

That is, the non-linear optimization unit 27 projects the landmark on a projection plane corresponding to the captured images on the basis of the position of the landmark in the reference space and projects the photographing positions and the photographing attitudes of the captured images in the reference space. Then, the non-linear optimization unit 27 adjusts the photographing positions and the photographing attitudes of the captured images in the reference space and the position of the landmark in the reference space to reduce an error between a projection position of the landmark on the projection plane and a projection position of a corresponding point that corresponds to the landmark in an actual captured image. This process of adjusting the photographing positions and the photographing attitudes of the captured image and the position of the landmark is also called a bundle adjustment.

The non-linear optimization unit 27 generates position/attitude information using the adjusted photographing positions and photographing attitudes of the captured images through the non-linear optimization as final photographing positions and photographing attitudes of the captured images in the reference space and generates landmark information using the adjusted position of the landmark through the non-linear optimization and the corresponding point information.

Referring to the landmark information, a captured image, a position therein at which a corresponding point (a feature point) corresponding to each landmark is detected, and the position of the landmark in the reference space can be ascertained.

The position/attitude information and the landmark information generated by the non-linear optimization unit 2 are supplied to and recorded in the recording unit 24.

In Step S18, the control unit 29 determines whether photographing positions and photographing attitudes of all of the captured images when the images were captured are inferred.

When the photographing positions and photographing attitudes of all of the captured images are determined not to have yet been inferred in Step S18, the process proceeds to Step S19.

In Step S19, the control unit 29 determines whether the photographing positions and photographing attitudes of the captured images are to be inferred using the four-common-point inference technique. For example, the control unit 29 determines whether the photographing positions and photographing attitudes of the captured images are to be inferred using the four-common-point inference technique on the basis of an operation signal supplied from the input unit 28 when the user or the like operates the input unit 28 to designate the technique for inferring the photographing positions and photographing attitude of the captured images.

In the case in which it is determined that the photographing positions and photographing attitudes of the captured images are to be inferred using the four-common-point inference technique in Step S19, the control unit 29 instructs the position/attitude calculation unit 25 to perform inference using the four-common-point inference technique, and then the process proceeds to Step S20.

In Step S20, the image processing device 11 performs the position/attitude inference process using the four-common-point inference technique to calculate photographing position and a photographing attitude of a captured image to be processed. Accordingly, attitude/position information of a captured image of which a new photographing position and photographing attitude have been inferred and the landmark information is recorded in the recording unit 24.

After the position/attitude inference process using the four-common-point inference technique is performed, the process then returns to Step S18, and the above-described process is repeated. Note that details of the position/attitude inference process using the four-common-point inference technique will be described below.

In addition, in the case in which it is determined that the photographing positions and photographing attitudes of the captured images are not to be inferred using the four-common-point inference technique in Step S19, the control unit 29 determines whether the photographing positions and photographing attitudes of the captured images are to be inferred using the one-common-point inference technique in Step S21.

In the case in which it is determined that the photographing positions and photographing attitudes of the captured images are to be inferred using the one-common-point inference technique in Step S21, the control unit 29 instructs the position/attitude calculation unit 25 to perform inference using the one-common-point inference technique, and then the process proceeds to Step S22.

In Step S22, the image processing device 11 performs the position/attitude inference process using the one-common-point inference technique to calculate photographing position and a photographing attitude of a captured image to be processed. Accordingly, attitude/position information of a captured image of which a new photographing position and photographing attitude have been inferred and the landmark information is recorded in the recording unit 24.

After the position/attitude inference process using the one-common-point inference technique is performed, the process then returns to Step S18, and the above-described process is repeated. Note that details of the position/attitude inference process using the one-common-point inference technique will be described below.

In addition, in the case in which it is determined that the photographing positions and photographing attitudes of the captured images are not to be inferred using the one-common-point inference technique in Step S21, the control unit 29 instructs the position/attitude calculation unit 25 to perform inference using the zero-common-point inference technique, and the process proceeds to Step S23. Then in Step S23, the image processing device 11 performs the position/attitude inference process using the zero-common-point inference technique to calculate the photographing position and photographing attitude of the captured image to be processed. Accordingly, attitude/position information of a captured image of which a new photographing position and photographing attitude have been inferred and the landmark information is recorded in the recording unit 24.

After the position/attitude inference process using the zero-common-point inference technique is performed, the process then returns to Step S18, and the above-described process is repeated. Note that details of the position/attitude inference process using the zero-common-point inference technique will be described below.

Furthermore, in the case in which it is determined that the photographing positions and photographing attitudes of all of the captured images are inferred in Step S18, the image processing unit 30 reads the captured images and the position/attitude information from the recording unit 24 and generates a reproduction image in Step S24. Then, the image processing unit 30 supplies the generated reproduction image to the reproduction control unit 31.

For example, the image processing unit 30 generates captured images having viewpoint positions set at positions of two cameras, which are arranged to be adjacent to each other in the reference space, using image processing such as an interpolation on the basis of captured images of the cameras and the position/attitude information in accordance with control of the control unit 29.

Then, the image processing unit 30 generates a reproduction image with which the captured images of the cameras at the respective positions and the newly generated captured images at the respective viewpoint positions are reproduced in order of the positions in the reference space. Accordingly, the reproduction image in which the cameras seem to be performing panning with respect to a still subject, for example, can be obtained.

Note that the reproduction image can be any image as long as it is an image for executing a reproduction process using a plurality of captured images and captured images generated through an interpolation process on the basis of a positional relation between photographing positions of the plurality of captured images in the reference space.

In Step S25, the reproduction control unit 31 supplies the reproduction image supplied from the image processing unit 30 to the display unit 32 to be reproduced, and then the reproduction process ends.

As described above, the image processing device 11 selects one of the four-common-point inference technique, the one-common-point inference technique, or the zero-common-point inference technique to calculate a photographing position and a photographing attitude of each captured image in the reference space using the selected inference technique.

By inferring a photographing position and a photographing attitude of a captured image by selecting one of the four-common-point inference technique, the one-common-point inference technique, and the zero-common-point inference technique as described above, the photographing position and the photographing attitude of the captured image can be reliably inferred with a more lenient photographing condition. In particular, by inferring the photographing position and the photographing attitude using the one-common-point inference technique or the zero-common-point inference technique, the photographing position and the photographing attitude of the captured image can be reliably inferred under a more lenient photographing condition.

Note that, when photographing positions and photographing attitudes of captured images are inferred, the same inference technique may be selected for all captured images, and the inference technique may be selected for each of the captured images. In addition, the inference technique may be selected on the basis of whether a condition for performing each of the inference techniques is satisfied or the like as well as the inference technique is selected through an external input by a user or the like.

<Description of Position/Attitude Inference Process Using Four-Common-Point Inference Technique>

Next, the processes of Steps S20, S22, and S23 of FIG. 9 will be described.

First, the position/attitude inference process using the four-common-point inference technique which corresponds to the process Step S20 of FIG. 9 will be described with reference to the flowchart of FIG. 10.

In Step S51, the corresponding image selection unit 43 selects a captured image, of which a photographing position and a photographing attitude in the reference space are unknown having four or more corresponding points that correspond to landmarks of which positions in the reference space are known, is selected as a captured image to be processed.

That is, the corresponding image selection unit 43 selects the captured image to be processed on the basis of the landmark information recorded in the recording unit 24. At this time, in a case in which there are a plurality of captured images that are candidates for processing, the corresponding image selection unit 43 selects a captured image of which a photographing position and a photographing attitude in the reference space are unknown and which has the largest number of corresponding points that correspond to landmarks of which positions in the reference space are known as a captured image to be processed. Accordingly, the captured image of which a photographing position and a photographing attitude in the reference space are unknown and which satisfies the condition for the four-common-point inference technique is selected as a captured image to be processed.

The corresponding image selection unit 43 reads the landmark information indicating positions of landmarks corresponding to corresponding points of the captured image to be processed in the reference space from the recording unit 24 and supplies the information to the position/attitude calculation unit 44.

In Step S52, the position/attitude calculation unit 44 calculates candidates for the photographing position and photographing attitude of the captured image to be processed in the reference space on the basis of the landmark information from the corresponding image selection unit 43 and supplies the calculation result and the landmark information to the re-projection unit 45.

For example, the position/attitude calculation unit 44 selects three corresponding points that correspond to the landmarks having known positions in the reference space among the corresponding points of the captured image to be processed. Then, the position/attitude calculation unit 44 calculates candidates for the photographing position and the photographing attitude of the captured image to be processed in the reference space using positions of the three selected corresponding points in the captured image and the positions of landmarks corresponding to these corresponding points in the reference space. Accordingly, four candidate photographing positions and photographing attitudes of the captured image to be processed are obtained.

In Step S53, the re-projection unit 45 determines the photographing position and the photographing attitude of the captured image in the reference space on the basis of the calculation result and the landmark information supplied from the position/attitude calculation unit 44, and then supplies the determination result to the landmark position calculation unit 26.

For example, the re-projection unit 45 selects one corresponding point that is not used in the process of Step S52 among the corresponding points that correspond to the landmarks of which the positions in the reference space are known in the captured image to be processed. Then, the re-projection unit 45 re-projects the landmark corresponding to the one selected corresponding point on a projection plane (captured image) at the position of the landmark having a candidate photographing position and photographing attitude with respect to each of the candidate photographing positions and photographing attitudes of the captured image to be processed.

Furthermore, the re-projection unit 45 determines a candidate at which an error between the projection position at which the landmark is re-projected and the actual position of the corresponding point has a minimum value as the final photographing position and photographing attitude of the captured image to be processed.

Figure 9:
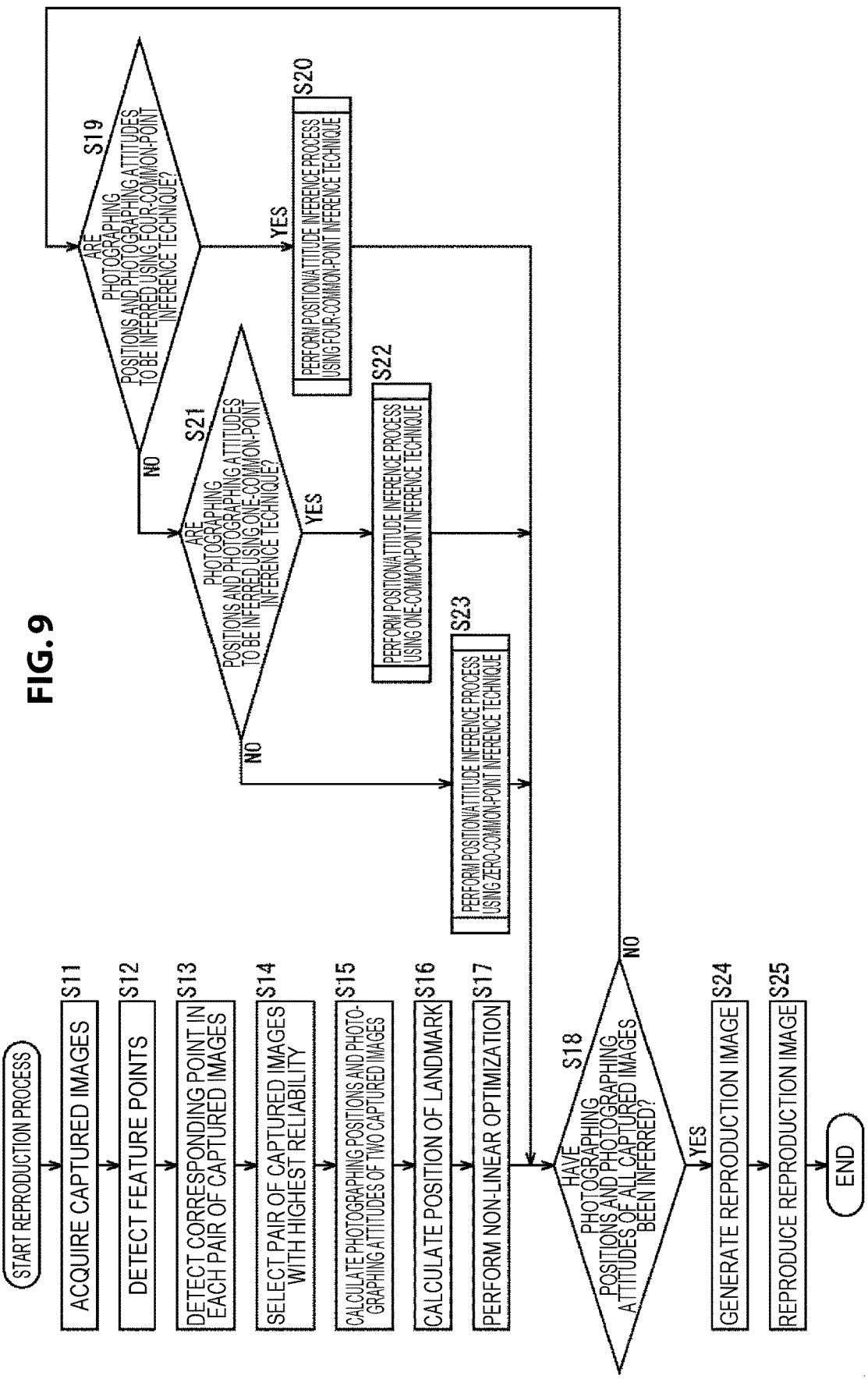
FIG. 9 is a flowchart for describing a reproduction process.

After the photographing position and the photographing attitude of the captured image to be processed are inferred as described above, the position/attitude inference process using the four-common-point inference technique ends after the processes of Steps S54 and S55 are performed, and then the process proceeds to Step S18 of FIG. 9.

Note that, since the processes of Steps S54 and S55 are similar to those of Steps S16 and S17 of FIG. 9, description thereof will be omitted.

In Steps S54 and S55, however, in a case in which there are corresponding points among those detected from the captured image to be processed that are common in another captured image of which a photographing position and a photographing attitude in the reference space are known, the position of the landmark in the reference space that correspond to all such corresponding points is calculated with respect to the corresponding points. Note that the position of the landmark is not calculated with respect to a corresponding point for which the position of the landmark has already been calculated.

In addition, at this time, the landmark position calculation unit 26 acquires the position/attitude information indicating a photographing position and a photographing attitude of a necessary captured image and the corresponding point information from the recording unit 24 via the non-linear optimization unit 27 to calculate the position of the landmark when necessary.

As described above, the image processing device 11 calculates the photographing position and the photographing attitude of the captured image to be processed using the four-common-point inference technique.

<Description of Position/Attitude Inference Process Using One-Common-Point Inference Technique>

Next, the position/attitude inference process using the one-common-point inference technique which corresponds to the process of Step S22 of FIG. 9 will be described with reference to the flowchart of FIG. 11.

In Step S81, the corresponding image selection unit 46 selects a captured image of which a photographing position and a photographing attitude are unknown as a captured image to be processed on the basis of the corresponding point information and the position/attitude information recorded in the recording unit 24, and selects a captured image of which a photographing position and a photographing attitude are known and which is most reliable for the captured image to be processed. The captured image of which the photographing position and the photographing attitude are known and which is most reliable for the captured image to be processed will also be referred to as a reference captured image. In the example illustrated in FIG. 5, for example, in the case in which the captured image CA33 is set as the captured image to be processed, the captured image CA32 is the reference captured image.

The corresponding image selection unit 46 reads corresponding point information indicating a relation between corresponding points of the captured image to be processed and the reference captured image and the position/attitude information of the reference captured image from the recording unit 24 and supplies the information to the basic matrix calculation unit 47. Note that the captured image to be processed and the reference captured image are assumed to have at least five or more corresponding points corresponding between the images. With respect to the five or more corresponding points, however, it is not necessary for positions of landmarks corresponding to the corresponding point to be known.

Furthermore, the corresponding image selection unit 46 searches for a landmark of which a position in the reference space is known among the landmarks corresponding to the corresponding points detected from the captured image to be processed with reference to the corresponding point information and the landmark information recorded in the recording unit 24. Then, the corresponding image selection unit 46 reads the landmark information indicating the position of one or more landmarks obtained as a result of the search in the reference space from the recording unit 24 and supplies the information to the basic matrix calculation unit 47.

Since the position of the landmark obtained from the above-described search is known, corresponding points that correspond to the landmark are present in at least two or more captured images of which photographing positions and photographing attitudes in the reference space are known. Thus, the two or more captured images of which the photographing positions and photographing attitudes are known and the captured image to be processed have the corresponding points that correspond to the landmark obtained from the search.

In the example illustrated in FIG. 5, for example, the portion P21 is obtained as a search result of a landmark of which a position in the reference space is known and a point corresponding thereto is present in the captured image CA33 to be processed. Since the portion P21 is observed in the two captured images CA31 and CA32 of which photographing positions and photographing attitudes in the reference space are known, the position of the portion P21 in the reference space is known.

Note that the captured image to be processed may have a corresponding point corresponding to the landmark obtained as a result of the search, and it is not necessary for the reference captured image to have the corresponding point corresponding to the landmark.

In Step S82, the basic matrix calculation unit 47 calculates a basic matrix on the basis of the corresponding point information supplied from the corresponding image selection unit 46, i.e., a positional relation between the corresponding point of the captured image to be processed and the corresponding point of the reference captured image.

The basic matrix calculation unit 47 supplies the calculated basic matrix, the corresponding point information, the position/attitude information, and the landmark information to the relative position/attitude calculation unit 48.

In Step S83, the relative position/attitude calculation unit 48 calculates a photographing position and photographing attitude of the captured image to be processed relative to the reference captured image on the basis of the basic matrix supplied from the basic matrix calculation unit 47. That is, a relative positional relation between the camera when the camera obtained the reference captured image and the camera when the camera obtained the captured image to be processed is calculated. In Step S83, for example, a similar process to Step S15 of FIG. 9 is performed. In this process, for example, a photographing position and photographing attitude of the captured image CA33 relative to the captured image CA32 are calculated in the example illustrated in FIG. 5.

The relative position/attitude calculation unit 48 supplies the calculated relative photographing position and photographing attitude of the captured image to be processed, the corresponding point information, the position/attitude information, and the landmark information to the position calculation unit 49.

In Step S84, the position calculation unit 49 calculates a photographing position of the captured image in the reference space on the basis of the relative photographing position and photographing attitude of the captured image to be processed, the corresponding point information, the position/attitude information, and the landmark information supplied from the relative position/attitude calculation unit 48.

That is, the position calculation unit 49 projects the landmark, which is indicated by the landmark information of which the position in the reference space is known, and is obtained as a result of the above-described search, on a projection plane corresponding to the captured image to be processed. Then, the position calculation unit 49 calculates the projection position of the captured image to be processed in the reference space on the basis of the projection position of the landmark and the position of the corresponding point corresponding to the landmark on the projection plane.

A position that can be the projection position of the landmark is determined on the basis of, for example, the photographing position and photographing attitude of the reference captured image in the reference space indicated by the position/attitude information, the relative photographing position and photographing attitude of the captured image to be processed, and the position of the landmark indicated by the landmark information. The position calculation unit 49 determines the photographing position of the captured image to be processed in the reference space so that the error between the projection position of the landmark and the actual position of the corresponding point that corresponds to the landmark has a minimum value.

Note that, in a case in which there are a plurality of common corresponding points in three or more captured images, the photographing position of the captured image to be processed in the reference space may be calculated using a least-squares method, a random sample consensus (RANSAC) method, or the like.

In addition, the photographing attitude of the captured image to be processed in the reference space and the photographing attitude of the reference captured image in the reference space are calculated using the photographing attitude of the captured image to be processed relative to the reference captured image.

The position calculation unit 49 supplies the calculated result of the photographing position and photographing attitude of the captured image to be processed in the reference space and the corresponding point information to the landmark position calculation unit 26.

After the photographing position and photographing attitude of the captured image to be processed are calculated, the position/attitude inference process using the one-common-point inference technique ends after the processes of Steps S85 and S86 are performed, and the process proceeds to Step S18 of FIG. 9.

Figure 10:
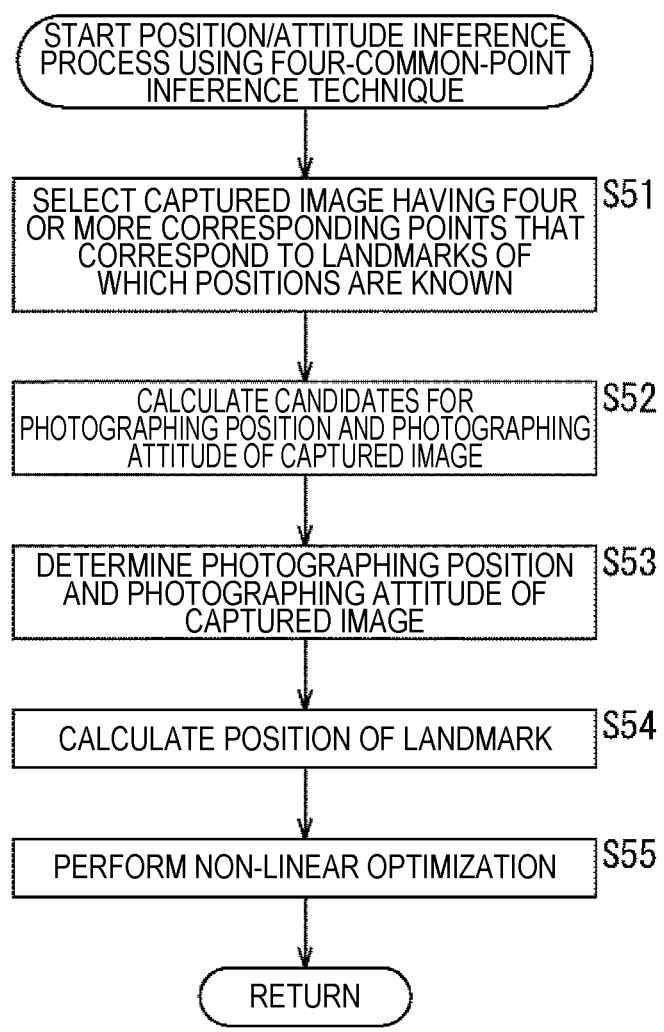
FIG. 10 is a flowchart for describing a position/attitude inference process using a 4-common-point inference technique.

Note that the processes of Steps S85 and S86 are similar to those of Steps S54 and S55 of FIG. 10, and thus description thereof will be omitted.

As described above, the image processing device 11 calculates the photographing position and the photographing attitude of the captured image to be processed using the one-common-point inference technique. If the one-common-point inference technique is used as described above, the photographing position and the photographing attitude of the captured image can be reliably inferred under a more lenient photographing condition.

Note that, in the above-described position/attitude inference process using the one-common-point inference technique, the captured image of which the photographing position and the photographing attitude in the reference space are known has been described as being set to be a reference captured image. However, the photographing position of the reference captured image may not necessarily be known when the reference captured image is selected, and a captured image of which a photographing position and a photographing attitude in the reference space can be calculated may be set as the reference captured image. That is, a captured image that can be set as the reference captured image may be a captured image that can be used to finally infer a photographing position and a photographing attitude of a captured image to be processed in the reference space.

<Description of Position/Attitude Inference Process Using Zero-Common-Point Inference Technique>

Figure 12:
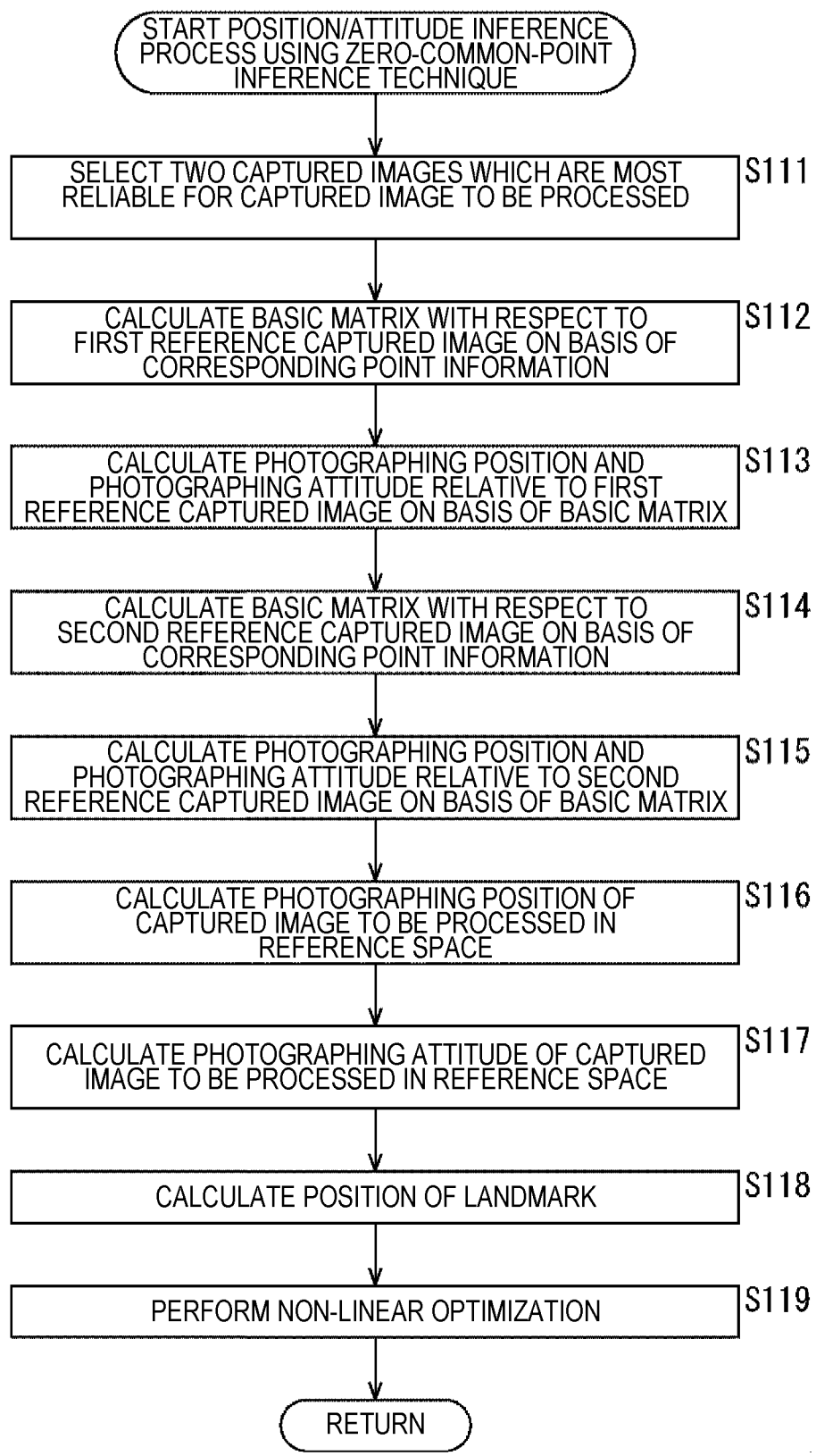
FIG. 12 is a flowchart for describing a position/attitude inference process using the zero-common-point inference technique.

Next, the position/attitude inference process using the zero-common-point inference technique which corresponds to the process of Step S23 of FIG. 9 will be described with reference to the flowchart of FIG. 12.

In Step S111, the corresponding image selection unit 50 selects a captured image of which a photographing position and a photographing attitude are unknown as a captured image to be processed on the basis of the corresponding point information and the position/attitude information recorded in the recording unit 24, and selects a captured image of which a photographing position and a photographing attitude are known and which is most reliable for the captured image to be processed. Also in Step S111, the corresponding image selection unit 50 selects two captured images of which photographing positions and photographing attitudes in the reference space, which are most reliable for the captured image to be processed, are known. The captured image of which the photographing position and the photographing attitude are known and which is most reliable for the captured image to be processed will also be referred to as a reference captured image.

In the case in which the captured image CA33 is the captured image to be processed in the example illustrated in FIG. 6, for example, the captured image CA31 and the captured image CA32 are selected as reference captured images.

The corresponding image selection unit 50 reads corresponding point information indicating a relation between corresponding points of each captured image to be processed and the reference captured image and the position/attitude information of each reference captured image from the recording unit 24 and supplies the information to the basic matrix calculation unit 51. Note that the captured image to be processed and the two reference captured image are each assumed to have at least five or more corresponding points corresponding between the images.

In Step S112, the basic matrix calculation unit 51 calculates a basic matrix with respect to a first reference captured image and the captured image to be processed on the basis of the corresponding point information supplied from the corresponding image selection unit 50.

The basic matrix calculation unit 51 supplies the calculated basic matrix, the corresponding point information, and the position/attitude information to the relative position/attitude calculation unit 52.

In Step S113, the relative position/attitude calculation unit 52 calculates a photographing position and photographing attitude of the captured image to be processed relative to the first reference captured image on the basis of the basic matrix supplied from the basic matrix calculation unit 51. That is, a relative positional relation between the camera when the camera obtained the first reference captured image and the camera when the camera obtained the captured image to be processed is calculated.

The relative position/attitude calculation unit 52 supplies the calculated relative photographing position and photographing attitude of the captured image to be processed, the corresponding point information and the position/attitude information to the position calculation unit 49.

Figure 11:
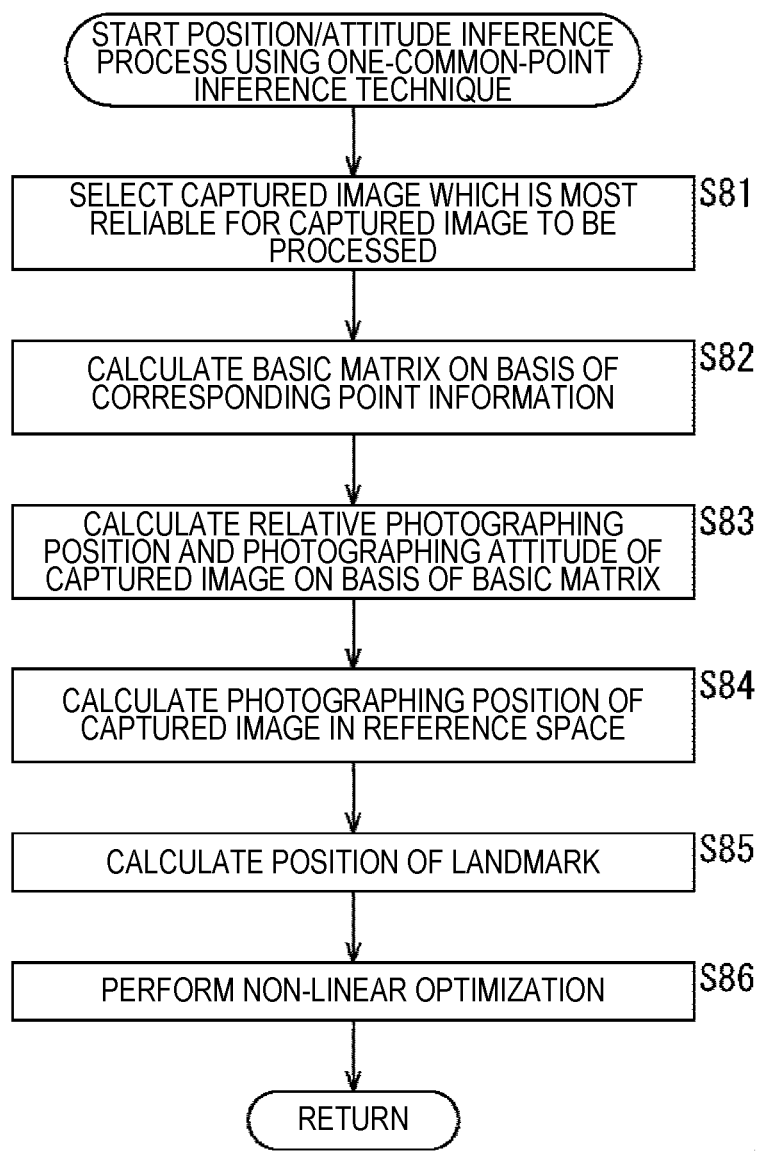
FIG. 11 is a flowchart for describing a position/attitude inference process using the 1-common-point inference technique.

Note that similar processes to those of Steps S82 and S83 of FIG. 11 are performed in Steps S112 and S113.

In addition, after the photographing position and photographing attitude of the captured image to be processed relative to the first reference captured image are calculated, the processes of Steps S114 and S115 are then performed, however, these processes are similar to those of Steps S112 and S113, and descriptions thereof will be omitted. That is, a photographing position and photographing attitude of the captured image to be processed relative to a second reference captured image are calculated in Steps S114 and S115.

In Step S116, the position calculation unit 53 calculates a photographing position of the captured image to be processed in the reference space on the basis of the calculation results of the relative photographing positions and photographing attitudes and the position/attitude information supplied from the relative position/attitude calculation unit 52.

For example, the position calculation unit 53 calculates a straight line connecting the photographing position of the first reference captured image in the reference space and the photographing position of the captured image to be processed using the photographing position of the captured image to be processed relative to the first reference captured image and the position/attitude information of the first reference captured image as a first detected straight line. Likewise, with respect to the second reference captured image, the position calculation unit 53 calculates a straight line connecting the photographing position of the second reference captured image in the reference space and the photographing position of the captured image to be processed as a second detected straight line. These two detected straight lines correspond to, for example, the straight lines L11 and L12 illustrated in FIG. 6.

Then, the position calculation unit 53 calculates an intersection position of the first detected straight line and the second detected straight line in the reference space, and sets the intersection position as a photographing position of the captured image to be processed in the reference space. Note that, more specifically, it is basically not necessary to calculate the detected straight lines and it is sufficient to calculate an intersection position of two detected straight lines in the reference space through an arithmetic operation.

In addition, when the first detected straight line and the second detected straight line do not intersect, a position closest to the detected straight lines, i.e., a position in a closest distance from the straight lines, may be calculated using the least-squares method, and a position obtained as a result of the calculation is set as a photographing position of the captured image to be processed in the reference space.

Furthermore, although the case in which there are two reference captured images has been described here, the number of reference captured images may be three or more. In such a case, a detected straight line may be calculated for each of the reference captured images and a photographing position of the captured image to be processed may be calculated on the basis of each of detected straight lines using the least-squares method, the RANSAC method, or the like.

The position calculation unit 53 supplies the photographing position of the captured image to be processed in the reference space obtained as described above, the calculated photographing attitude of the captured image to be processed relative to each of the reference captured images, the corresponding point information, and the position/attitude information to the attitude calculation unit 54.

In Step S117, the attitude calculation unit 54 calculates a photographing attitude of the captured image to be processed in the reference space on the basis of the relative photographing attitude of the captured image to be processed and the position/attitude information of the reference captured images supplied from the position calculation unit 53.

The attitude calculation unit 54 calculates a photographing attitude of the captured image to be processed in the reference space using for example, the position/attitude information of the first reference captured image and the photographing attitude of the captured image to be processed relative to the first reference captured image.

The attitude calculation unit 54 calculates a photographing attitude of the captured image to be processed in the reference space using similarly, the position/attitude information of the second reference captured image and the photographing attitude of the captured image to be processed relative to the second reference captured image.

Then, the attitude calculation unit 54 calculates the final photographing attitude of the captured image to be processed in the reference space using at least one of the two calculated photographing attitudes of the captured image to be processed in the reference space. For example, the photographing attitude of the captured image to be processed that is calculated for the reference captured image of which the photographing position is closer to the photographing position of the captured image to be processed among the two reference captured images may be set as the final photographing attitude. This is because a captured image of which a photographing position is closer to the captured image to be processed is supposed to have more corresponding points, and thus the photographing attitude of the captured image can be calculated with higher accuracy.

In addition, for example, an average value or a weighted value of photographing attitudes of the captured image to be processed in the reference space calculated with respect to the two reference captured images may be set as the final photographing attitude of the captured image to be processed in the reference space.

When the photographing position and the photographing attitude of the captured image to be processed are calculated as described above, the attitude calculation unit 54 supplies the photographing position and the photographing attitude of the captured image to be processed in the reference space and the corresponding point information to the landmark position calculation unit 26.

Further, after the photographing position and photographing attitude of the captured image to be processed in a reference space are calculated, the position/attitude inference process using the zero-common-point inference technique ends after the processes of Steps S118 and S119 are performed, and the process proceeds to Step S18 of FIG. 9.

Note that the processes of Steps S118 and S119 are similar to those of Steps S54 and S55 of FIG. 10, and thus description thereof will be omitted.

As described above, the image processing device 11 calculates the photographing position and the photographing attitude of the captured image to be processed using the zero-common-point inference technique. If the zero-common-point inference technique is used as described above, the photographing position and the photographing attitude of the captured image can be reliably inferred under a more lenient photographing condition.

Note that, in the above-described position/attitude inference process using the zero-common-point inference technique, the second captured image of which the photographing position and the photographing attitude in the reference space are known has been described as being set to be a reference captured image. However, the photographing position of the reference captured image may not necessarily be known when the reference captured image is selected, and a captured image of which a photographing position and a photographing attitude in the reference space can be calculated may be set as the reference captured image. That is, a captured image that can be set as the reference captured image may be a captured image that can be used to finally infer a photographing position and a photographing attitude of a captured image to be processed in the reference space.

Second Embodiment

<Description of Reproduction Process>

Note that the example in which the photographing position and the photographing attitude of the captured image to be processed are inferred using one of the four-common-point inference technique, the one-common-point inference technique, or the zero-common-point inference technique has been described above. However, for example, photographing positions and photographing attitudes of the captured image to be processed may be calculated using the three inference techniques and the most likely result among the calculation results may be employed as the final calculation result.

Figure 13:
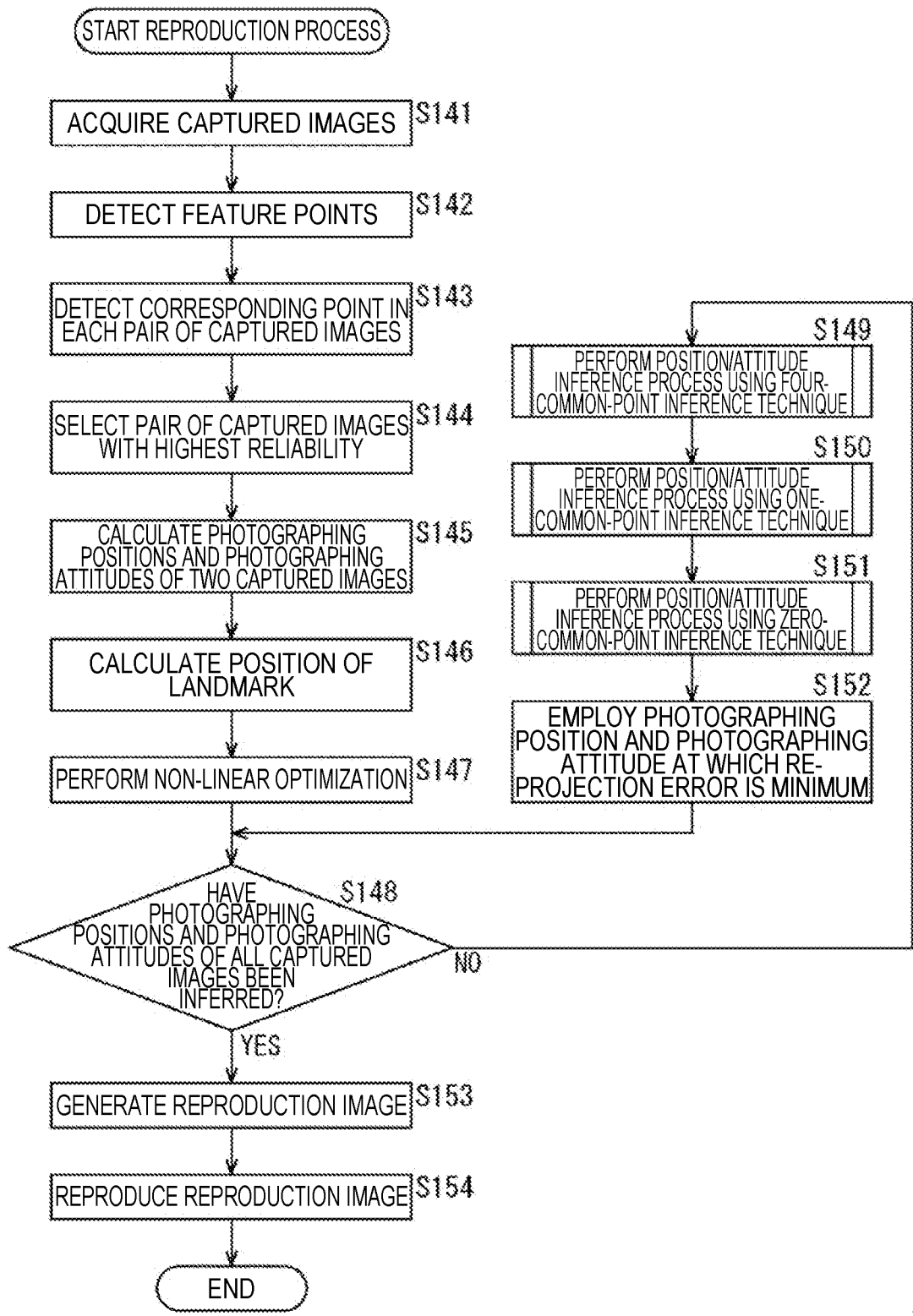
FIG. 13 is a flowchart for describing a reproduction process.

In such a case, for example, the reproduction process shown in FIG. 13 is performed. The reproduction process performed by the image processing device 11 will be described below with reference to the flowchart of FIG. 13.

Note that the processes of Step S141 to Step S148 are similar to those of Step S11 to Step S18 of FIG. 9, and thus description thereof will be omitted.

In Step S148, in a case in which photographing positions and photographing attitudes of all of the captured images are determined not to have been inferred, the image processing device 11 performs the position/attitude inference process using the four-common-point inference technique in Step S149. Note that, since the process of Step S149 is similar to the process of Step S20 of FIG. 9, i.e., the process described with reference to FIG. 10, description thereof will be omitted.

At the time of Step S149, however, the non-linear optimization unit 27 holds the position/attitude information inferred using the four-common-point inference technique and the landmark information without supplying the information to the recording unit 24.

In addition, in Step S150, the image processing device 11 performs the position/attitude inference process using the one-common-point inference technique. Note that, since the process of Step S150 is similar to the process of Step S22 of FIG. 9, i.e., the process described with reference to FIG. 11, description thereof will be omitted.

At the time of Step S150, however, the non-linear optimization unit 27 holds the position/attitude information inferred using the one-common-point inference technique and the landmark information without supplying the information to the recording unit 24.

In Step S151, the image processing device 11 performs the position/attitude inference process using the zero-common-point inference technique. Note that, since the process of Step S151 is similar to the process of Step S23 of FIG. 9, i.e., the process described with reference to FIG. 12, description thereof will be omitted.

At the time of Step S151, however, the non-linear optimization unit 27 holds the position/attitude information inferred using the zero-common-point inference technique and the landmark information without supplying the information to the recording unit 24.

Further, the same captured image is selected as a captured image to be processed in Steps S149 to S151, and a photographing position and a photographing attitude of the captured image to be processed are calculated.

In Step S152, the non-linear optimization unit 27 employs a photographing position and a photographing attitude at which a re-projection error is minimized as a final photographing position and photographing attitude of the captured image to be processed in the reference space on the basis of the photographing positions and photographing attitudes of the captured image to be processed and positions of landmarks obtained in the processes of Step S149 to Step S151.

That is, the non-linear optimization unit 27 projects the landmarks on a projection plane on the basis of the positions of the landmarks and the photographing positions and photographing attitudes of the captured image to be processed obtained using the inference techniques and calculates errors between the projection positions and the positions of corresponding points of the captured image that correspond to the landmarks on the projection plane.

The non-linear optimization unit 27 calculates an average value of the calculated errors of the landmarks or the like as an evaluation value and selects an inference technique that brings the minimum evaluation value, i.e., an inference technique with the minimum error, among the inference techniques. The non-linear optimization unit 27 employs the photographing position and the photographing attitude of the captured image to be processed obtained using the selected inference technique as the final photographing position and photographing attitude. Accordingly, the inference technique in which the photographing position and the photographing attitude can be inferred with highest accuracy among the inference techniques can be employed.

In addition, the non-linear optimization unit 27 supplies the position/attitude information indicating the finally obtained photographing position and photographing attitude of the captured image to be processed in the reference space and the landmark information calculated along with the position/attitude information to the recording unit 24 to be recorded therein.

After the non-linear optimization unit 27 infers the final photographing position and photographing attitude of the captured image to be processed, the process returns to Step S148 and the above-described processes are repeated.

In addition, after it is determined in Step S148 that photographing positions and photographing attitudes of all of the captured images have been inferred, the processes of Steps S153 and S154 are performed and the reproduction process ends, however the processes are similar to those of Steps S24 and S25 of FIG. 9, and thus description thereof will be omitted.

As described above, the image processing device 11 calculates the photographing positions and photographing attitudes of the captured image to be processed using each of the inference techniques and employs the calculation result with the highest accuracy among the calculation results as the final photographing position and photographing attitude. Accordingly, the most accurate photographing position and photographing attitude of the captured image to be processed can be reliably inferred under a more lenient photographing condition.

Note that, although the example in which photographing positions and photographing attitudes of the captured image are calculated using the three inference techniques and the most accurate calculation result is selected has been described above, photographing positions and photographing attitudes of the captured image may be calculated using two or more different inference techniques and the most accurate calculation result may be selected.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 14 is a block diagram showing an example configuration of the hardware of a computer that executes the series of processes described earlier according to a program.

In a computer, a CPU (Central Processing Unit) 501, a ROM (Read Only Memory) 502, and a RAM (Random Access Memory) 503 are mutually connected by a bus 504.

An input/output interface 505 is also connected to the bus 504. An input unit 506, an output unit 507, a recording unit 508, a communication unit 509, and a drive 510 are connected to the input/output interface 505.

The input unit 506 is configured from a keyboard, a mouse, a microphone, an imaging element or the like. The output unit 507 configured from a display, a speaker or the like. The recording unit 508 is configured from a hard disk, a non-volatile memory or the like. The communication unit 509 is configured from a network interface or the like. The drive 510 drives a removable recording medium 511 such as a magnetic disk, an optical disk, a magneto-optical disk, a semiconductor memory or the like.

In the computer configured as described above, as one example the CPU 501 loads a program recorded in the recording unit 508 via the input/output interface 505 and the bus 504 into the RAM 503 and executes the program to carry out the series of processes described earlier.

As one example, the program executed by the computer (the CPU 501) may be provided by being recorded on the removable recording medium 511 as a packaged medium or the like. The program can also be provided via a wired or wireless transfer medium, such as a local area network, the Internet, or a digital satellite broadcast.

In the computer, by loading the removable recording medium 511 into the drive 510, the program can be installed into the recording unit 508 via the input/output interface 505. It is also possible to receive the program from a wired or wireless transfer medium using the communication unit 509 and install the program into the recording unit 508. As another alternative, the program can be installed in advance into the ROM 502 or the recording unit 508.

Note that the program executed by the computer may be a program in which processes are carried out in a time series in the order described in this specification or may be a program in which processes are carried out in parallel or at necessary timing, such as when the processes are called.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technology may also be configured as below.

(1)

An information processing method for inferring photographing positions and photographing attitudes of a plurality of captured images at least including a first captured image captured at a first photographing position and a first photographing attitude, a second captured image captured at a second photographing position and a second photographing attitude, and a third captured image captured at a third photographing position and a third photographing attitude, the information processing method including the steps of, in a case where the first photographing position and the first photographing attitude, and the second photographing position and the second photographing attitude in a reference space can be inferred:

inferring a relative positional relation between the second photographing position and the third photographing position on the basis of a common corresponding point included in each of the second captured image and the third captured image; and inferring the first photographing position and the first photographing attitude, the second photographing position and the second photographing attitude, and the third photographing position and the third photographing attitude in the reference space on the basis of the relative positional relation between the second photographing position and the third photographing position and a common corresponding point included in each of the first captured image and the third captured image.

(2)

The information processing method according to (1), in which the second captured image and the third captured image have the at least five or more common corresponding points.

(3)

The information processing method according to (1) or (2), in which a relative positional relation between the first photographing position and the third photographing position is further inferred on the basis of the common corresponding point included in the first captured image and the third captured image respectively, and the first photographing position and the first photographing attitude, the second photographing position and the second photographing attitude, and the third photographing position and the third photographing attitude in the reference space are inferred on the basis of the relative positional relation between the second photographing position and the third photographing position and the relative positional relation between the first photographing position and the third photographing position.

(4)

The information processing method according to (3), in which the first captured image and the third captured image have the at least five or more common corresponding points.

(5)

The information processing method according to (3) or (4), in which the third photographing position in the reference space is inferred by calculating an intersection position between a first straight line which connects the second photographing position and the third photographing position and is determined on the basis of the relative positional relation between the second photographing position and the third photographing position, and a second straight line which connects the first photographing position and the third photographing position and is determined on the basis of the relative positional relation between the first photographing position and the third photographing position, or a position that is closest from the first straight line and the second straight line.

(6)

The information processing method according to any one of (3) to (5), in which the third photographing attitude in the reference space is inferred on the basis of at least one of an inference result of the third photographing attitude based on the common corresponding point included in each of the second captured image and the third captured image and an inference result of the third photographing attitude based on the common corresponding point included in each of the first captured image and the third captured image.

(7)

The information processing method according to (1) or (2), in which the third photographing position in the reference space is inferred on the basis of the relative positional relation between the second photographing position and the third photographing position and a common corresponding point included in each of the first captured image, the second captured image, and the third captured image.

(8)

The information processing method according to any one of (1) to (7), in which the first captured image, the second captured image, and the third captured image are images captured by different photographing units.

(9)

The information processing method according to any one of (1) to (7), in which the first captured image, the second captured image, and the third captured image are images captured by the same photographing unit.

(10)

The information processing method according to any one of (1) to (9), further including:

performing predetermined image processing on the basis of the third photographing position and the third photographing attitude in the reference space and the third captured image.

(11)

The information processing method according to any one of (1) to (9), further including:

performing a reproduction process using the first captured image, the second captured image, and the third captured image on the basis of a positional relation between the first photographing position, the second photographing position, and the third photographing position.

(12)

An information processing device which infers photographing positions and photographing attitudes of a plurality of captured images at least including a first captured image captured at a first photographing position and a first photographing attitude, a second captured image captured at a second photographing position and a second photographing attitude, and a third captured image captured at a third photographing position and a third photographing attitude, the information processing device including, in a case where the first photographing position and the first photographing attitude, and the second photographing position and the second photographing attitude in a reference space can be inferred:

a relative positional relation inferring unit configured to infer a relative positional relation between the second photographing position and the third photographing position on the basis of a common corresponding point included in each of the second captured image and the third captured image; and a position/attitude inferring unit configured to infer the first photographing position and the first photographing attitude, the second photographing position and the second photographing attitude, and the third photographing position and the third photographing attitude in the reference space on the basis of the relative positional relation between the second photographing position and the third photographing position and a common corresponding point included in each of the first captured image and the third captured image.

(13)

A program causing a computer, the computer controlling an image processing device which infers photographing positions and photographing attitudes of a plurality of captured images at least including a first captured image captured at a first photographing position and a first photographing attitude, a second captured image captured at a second photographing position and a second photographing attitude, and a third captured image captured at a third photographing position and a third photographing attitude, to perform a process including the steps of, in a case where the first photographing position and the first photographing attitude, and the second photographing position and the second photographing attitude in a reference space can be inferred, inferring a relative positional relation between the second photographing position and the third photographing position on the basis of a common corresponding point included in each of the second captured image and the third captured image, and inferring the first photographing position and the first photographing attitude, the second photographing position and the second photographing attitude, and the third photographing position and the third photographing attitude in the reference space on the basis of the relative positional relation between the second photographing position and the third photographing position and a common corresponding point included in each of the first captured image and the third captured image.

REFERENCE SIGNS LIST 11 image processing device
21 image acquisition unit
22 feature point detection unit
23 corresponding point detection unit
24 recording unit
25 position/attitude calculation unit
26 landmark position calculation unit
27 non-linear optimization unit
30 image processing unit
46 corresponding image selection unit
47 basic matrix calculation unit
48 relative position/attitude calculation unit
49 position calculation unit
50 corresponding image selection unit
51 basic matrix calculation unit
52 relative position/attitude calculation unit
53 position calculation unit
54 attitude calculation unit

The invention claimed is:

1. An information processing method comprising:
determining, with an electronic processor, whether a first photographing position and a first photographing attitude of a first captured image in a reference space can be inferred;
determining, with the electronic processor, whether a second photographing position and a second photographing attitude of a second captured image in the reference space can be inferred;
responsive to determining that the first photographing position and the first photographing attitude of the first captured image and the second photographing position and the second photographing attitude of the second captured image in the reference space can be inferred, inferring a relative positional relation between the second photographing position and a third photographing position of a third captured image on a basis of a common corresponding point included in each of the second captured image and the third captured image, the common corresponding point based on a physical feature in the each of the second captured image and the third captured image; and
responsive to determining that the first photographing position and the first photographing attitude of the first captured image and the second photographing position and the second photographing attitude of the second captured image in the reference space can be inferred, inferring the first photographing position, the first photographing attitude, the second photographing position, the second photographing attitude, the third photographing position, and a third photographing attitude of the third captured image in the reference space on a basis of the relative positional relation between the second photographing position and the third photographing position and a common corresponding point included in each of the first captured image and the third captured image, the common corresponding point based on a physical feature in the each of the first captured image and the third captured image.

2. The information processing method according to claim 1, wherein the second captured image and the third captured image have at least five or more common corresponding points.

3. The information processing method according to claim 1,
wherein a relative positional relation between the first photographing position and the third photographing position is further inferred on a basis of the common corresponding point included in the first captured image and the third captured image respectively, and
the first photographing position, the first photographing attitude, the second photographing position, the second photographing attitude, the third photographing position, and the third photographing attitude in the reference space are inferred on a basis of the relative positional relation between the second photographing position and the third photographing position and the relative positional relation between the first photographing position and the third photographing position.

4. The information processing method according to claim 3, wherein the first captured image and the third captured image have at least five or more common corresponding points.

5. The information processing method according to claim 3, wherein the third photographing position in the reference space is inferred by calculating an intersection position between a first straight line which connects the second photographing position and the third photographing position and is determined on a basis of the relative positional relation between the second photographing position and the third photographing position, and a second straight line which connects the first photographing position and the third photographing position and is determined on a basis of the relative positional relation between the first photographing position and the third photographing position, or a position that is closest from the first straight line and the second straight line.

6. The information processing method according to claim 3, wherein the third photographing attitude in the reference space is inferred on a basis of at least one of an inference result of the third photographing attitude based on the common corresponding point included in each of the second captured image and the third captured image and an inference result of the third photographing attitude based on the common corresponding point included in each of the first captured image and the third captured image.

7. The information processing method according to claim 1, wherein the third photographing position in the reference space is inferred on a basis of the relative positional relation between the second photographing position and the third photographing position and a common corresponding point included in each of the first captured image, the second captured image, and the third captured image.

8. The information processing method according to claim 1, wherein the first captured image, the second captured image, and the third captured image are images captured by different photographing units.

9. The information processing method according to claim 1, wherein the first captured image, the second captured image, and the third captured image are images captured by a single photographing unit.

10. The information processing method according to claim 1, further comprising:
performing predetermined image processing on a basis of the third photographing position and the third photographing attitude in the reference space and the third captured image.

11. The information processing method according to claim 1, further comprising:
performing a reproduction process using the first captured image, the second captured image, and the third captured image on a basis of a positional relation between the first photographing position, the second photographing position, and the third photographing position.

12. An information processing device comprising:
a memory including a relative positional relation inferring program and a position/attitude inferring program; and
an electronic processor configured to
determine whether a first photographing position and a first photographing attitude of a first captured image in a reference space can be inferred, and
determine whether a second photographing position and a second photographing attitude of a second captured image in the reference space can be inferred,
infer, with the relative positional relation inferring program, a relative positional relation between the second photographing position and a third photographing position of a third captured image on a basis of a common corresponding point included in each of the second captured image and the third captured image in response to the electronic processor determining that the first photographing position and the second photographing position in the reference space can be inferred, the common corresponding point based on a physical feature in the each of the second captured image and the third captured image, and
infer, with the position/attitude inferring program, the first photographing position, the first photographing attitude, the second photographing position, the second photographing attitude, the third photographing position, and a third photographing attitude of the third captured image in the reference space on a basis of the relative positional relation between the second photographing position and the third photographing position and a common corresponding point included in each of the first captured image and the third captured image in response to the electronic processor determining that the first photographing position and the second photographing position in the reference space can be inferred, the common corresponding point based on a physical feature in the each of the first captured image and the third captured image.

13. A non-transitory computer-readable medium comprising a program that, when executed by an electronic processor, causes the electronic processor to perform a set of operations comprising:
determining whether a first photographing position and a first photographing attitude of a first captured image in a reference space can be inferred;
determining whether a second photographing position and a second photographing attitude of a second captured image in the reference space can be inferred;
responsive to determining that the first photographing position and the first photographing attitude of the first captured image and the second photographing position and the second photographing attitude of the second captured image in the reference space can be inferred, inferring a relative positional relation between the second photographing position and a third photographing position of a third captured image on a basis of a common corresponding point included in each of the second captured image and the third captured image, the common corresponding point based on a physical feature in the each of the second captured image and the third captured image; and
responsive to determining that the first photographing position and the first photographing attitude of the first captured image and the second photographing position and the second photographing attitude of the second captured image in the reference space can be inferred, inferring the first photographing position, the first photographing attitude, the second photographing position, the second photographing attitude, the third photographing position, and a third photographing attitude of the third captured image in the reference space on a basis of the relative positional relation between the second photographing position, the third photographing position, and a common corresponding point included in each of the first captured image and the third captured image, the common corresponding point based on a physical feature in the each of the first captured image and the third captured image.

14. The non-transitory computer-readable medium according to claim 13, wherein the second captured image and the third captured image have at least five or more common corresponding points.

15. The non-transitory computer-readable medium according to claim 13, wherein the set of operations further includes
inferring a relative positional relation between the first photographing position and the third photographing position on a basis of the common corresponding point included in the first captured image and the third captured image respectively, and
inferring the first photographing position, the first photographing attitude, the second photographing position, the second photographing attitude, the third photographing position, and the third photographing attitude in the reference space on a basis of the relative positional relation between the second photographing position and the third photographing position and the relative positional relation between the first photographing position and the third photographing position.

16. The non-transitory computer-readable medium according to claim 15, wherein the first captured image and the third captured image have at least five or more common corresponding points.

17. The non-transitory computer-readable medium according to claim 15, wherein the third photographing position in the reference space is inferred by calculating an intersection position between a first straight line which connects the second photographing position and the third photographing position and is determined on a basis of the relative positional relation between the second photographing position and the third photographing position, and a second straight line which connects the first photographing position and the third photographing position and is determined on a basis of the relative positional relation between the first photographing position and the third photographing position, or a position that is closest from the first straight line and the second straight line.

18. The non-transitory computer-readable medium according to claim 13, wherein the third photographing position in the reference space is inferred on a basis of the relative positional relation between the second photographing position and the third photographing position and a common corresponding point included in each of the first captured image, the second captured image, and the third captured image.

19. The information processing device according to claim 12,
wherein the electronic processor is further configured to infer, with the relative positional relation inferring program, a relative positional relation between the first photographing position and the third photographing position on a basis of the common corresponding point included in the first captured image and the third captured image respectively, and
wherein the electronic processor is further configured to infer, with the position/attitude inferring program, the first photographing position, the first photographing attitude, the second photographing position, the second photographing attitude, the third photographing position, and the third photographing attitude in the reference space on a basis of the relative positional relation between the second photographing position and the third photographing position and the relative positional relation between the first photographing position and the third photographing position.

20. The information processing device according to claim 12, wherein the third photographing position in the reference space is inferred on a basis of the relative positional relation between the second photographing position and the third photographing position and a common corresponding point included in each of the first captured image, the second captured image, and the third captured image.

* * * * *